US011854535B1

(12) United States Patent
Zhang et al.

(10) Patent No.: US 11,854,535 B1
(45) Date of Patent: Dec. 26, 2023

(54) PERSONALIZATION FOR SPEECH PROCESSING APPLICATIONS

(71) Applicant: Amazon Technologies, Inc., Seattle, WA (US)

(72) Inventors: Sihui Zhang, Bellevue, WA (US); Amber Roy Chowdhury, Bellevue, WA (US); Hassan Haider Malik, Issaquah, WA (US); Sanjay Kumar, Kirkland, WA (US); Uday S. Sandhar, Seattle, WA (US); Pawel Matykiewicz, Bellevue, WA (US); Ming Ma, Bellevue, WA (US); Anand Vishwanath Suvarnkar, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 851 days.

(21) Appl. No.: 16/365,033

(22) Filed: Mar. 26, 2019

(51) Int. Cl.
*G10L 15/22* (2006.01)
*G10L 15/08* (2006.01)
*G10L 15/18* (2013.01)
*G10L 15/16* (2006.01)

(52) U.S. Cl.
CPC .............. *G10L 15/08* (2013.01); *G10L 15/18* (2013.01); *G10L 15/1815* (2013.01); *G10L 15/1822* (2013.01); *G10L 15/22* (2013.01); *G10L 15/16* (2013.01); *G10L 2015/223* (2013.01); *G10L 2015/227* (2013.01)

(58) Field of Classification Search
None
See application file for complete search history.

(56) References Cited

U.S. PATENT DOCUMENTS

| | | | |
|---|---|---|---|
| 9,922,642 B2 * | 3/2018 | Pitschel | G10L 15/063 |
| 10,607,042 B1 * | 3/2020 | Dasgupta | G06F 40/30 |
| 2011/0144999 A1 * | 6/2011 | Jang | G06K 9/00892 704/270.1 |
| 2013/0073571 A1 * | 3/2013 | Coulet | G06F 40/30 707/755 |
| 2013/0097146 A1 * | 4/2013 | Lanphear | G06F 16/951 707/706 |

(Continued)

*Primary Examiner* — Richard Z Zhu
(74) *Attorney, Agent, or Firm* — K&L Gates LLP

(57) ABSTRACT

Devices and techniques are generally described for machine learning personalization as a service for speech processing applications. In various examples, a first request for machine learning prediction for a first speech processing skill. First skill data schema data may be received that describes content of the first speech processing skill. A first machine learning model for the first speech processing skill may be determined. A first feature definition describing a first aspect of the content may be determined. A second feature definition describing user profile data may be determined. A prediction request may be received from the first speech processing skill. First feature data may be generated according to the first feature definition and second feature data may be generated according to the second feature definition based at least in part on the prediction request. The first machine learning model may generate prediction data based at least in part on the prediction request, the first feature data, and the second feature data.

20 Claims, 10 Drawing Sheets

(56) References Cited

U.S. PATENT DOCUMENTS

| | | | |
|---|---|---|---|
| 2014/0222422 A1* | 8/2014 | Sarikaya | G06F 40/35 704/231 |
| 2014/0257795 A1* | 9/2014 | Birnbaum | G06Q 30/02 704/9 |
| 2015/0039292 A1* | 2/2015 | Suleman | G06F 16/285 704/9 |
| 2015/0317302 A1* | 11/2015 | Liu | G06F 16/90332 704/9 |
| 2016/0098393 A1* | 4/2016 | Hebert | G06F 16/3344 704/9 |
| 2016/0225370 A1* | 8/2016 | Kannan | G10L 15/063 |
| 2017/0140754 A1* | 5/2017 | Ichimura | G10L 15/1822 |
| 2017/0365252 A1* | 12/2017 | Ushio | G06F 40/30 |
| 2018/0011838 A1* | 1/2018 | Beller | G06F 40/186 |
| 2018/0060303 A1* | 3/2018 | Sarikaya | G10L 15/063 |
| 2018/0336887 A1* | 11/2018 | Song | G06N 3/02 |
| 2019/0243669 A1* | 8/2019 | Gupta | G10L 15/26 |
| 2019/0279618 A1* | 9/2019 | Yadav | G06F 40/216 |
| 2019/0361978 A1* | 11/2019 | Ray | G06N 3/006 |

\* cited by examiner

PERSONALIZATION FOR SPEECH PROCESSING APPLICATIONS

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wake-word". Natural language processing is used to translate the spoken requests into semantic interpretations of the spoken command. Executable instructions are generated based on the semantic interpretation of the spoken command. The executable instructions are executed and a corresponding task is performed. Such speech processing and voice control may be used by personal computers, hand-held devices, telephone computer systems, and a wide variety of other computing devices to improve human-computer interactions and to control various systems. In various examples, speech processing enabled devices may comprise or may be configured in communication with displays for showing images and video and/or speakers for outputting audio.

DETAILED DESCRIPTION

Figure 1:
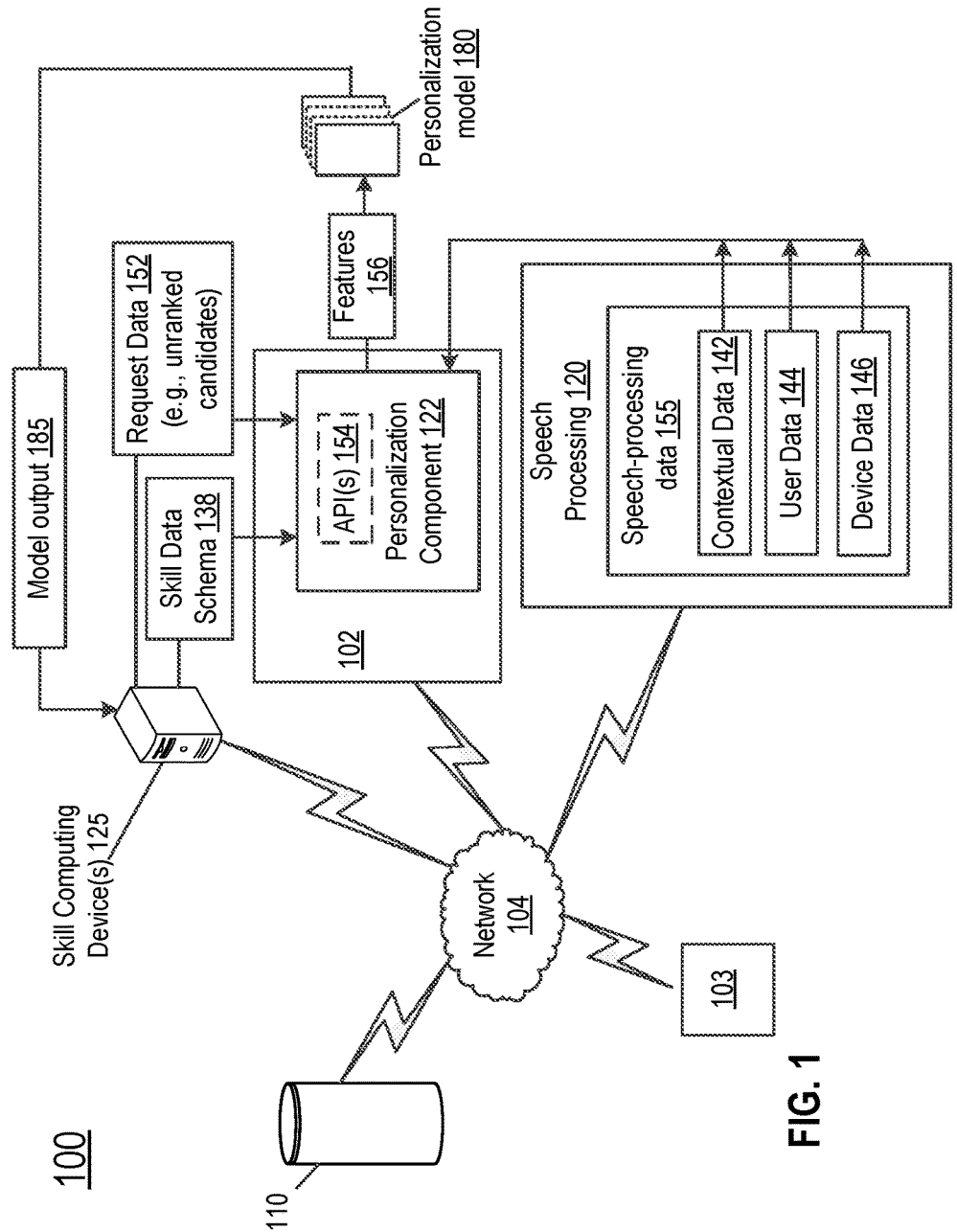
FIG. 1 is a diagram of an example system configured to provide a personalization for speech processing applications, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., a user utterance) and may generate output audio data in response to the utterance.

Speech processing may be used in a variety of contexts, including in speech processing enabled devices (e.g., devices employing voice control and/or speech processing "personal assistants") and/or systems. Examples of speech processing systems and/or voice-enabled personal assistants include the Sin system from Apple Inc. of Cupertino, California, voice-enabled actions invoked by the Google Assistant system from Google LLC of Mountain View, California, Dragon speech recognition software from Nuance Communications of Burlington, Massachusetts, the Cortana system from Microsoft of Redmond, Washington, voice-enabled skills invoked by the Alexa system from Amazon.com, Inc. of Seattle, Washington, etc.

Speech processing enabled devices may include microphones (e.g., far-field microphone arrays) used to transform audio into electrical signals. Speech processing may then be performed, either locally by the speech-processing enabled device, by one or more other computing devices communicating with the speech-processing enabled device over a network, or by some combination of the speech-processing enabled device and the one or more other computing devices. In various examples, speech-processing enabled devices may include and/or may be configured in communication with speakers and/or displays effective to output information obtained in response to a user's spoken request or command, or to output content that may be of interest to one or more user's (e.g., determined using the content recommendation models described herein).

Described herein are various techniques for providing machine learning personalized prediction as a service in order to dynamically determine candidate actions that are most likely to be of interest to users of a speech processing skill. In various examples, candidate actions may be determined based on user feedback, contextual data, device-specific data, user data and/or other available data. Additionally, candidate actions may be determined without requiring the developer of the speech processing skill to implement the relevant machine learning model(s). Advantageously, the various systems, models, and techniques described herein may provide candidate actions (e.g., content suggestions and/or actions) that are most likely to be of interest to a user, in a concise and non-intrusive manner, while avoiding candidate actions that are less likely to be of interest. Further, the various systems, models, and techniques described herein may tailor content to users over time and may adapt content to changes in user interests, user preferences, changing device settings and/or location, etc. Additionally, the predictive capability of the various systems, models, and techniques described herein may improve over time as more and more data is available that may be used to optimize machine learning techniques used to form predictions concerning the most relevant candidate actions. As used herein, candidate actions may refer to actions that may be taken by a skill (e.g., the output of the skill). In at least some examples, such candidate actions may include content that may be output by a skill. For example, content may comprise a video file that may be output by the skill, an audio file that may be output by the skill, etc. In various examples, metadata may be used to represent and/or describe some aspect of a candidate action that may be provided by the skill (e.g., upon user selection of the candidate action). For example, a movie title may be metadata related to a video file that may be output by the skill. A ranked list of movie titles may be output by the skill and a user may optionally select one or more movie titles to initiate playback of the video file associated with the selected movie title. Additionally, recommended candidate actions may be determined by a personalization component based on user data without exposing the user data to the speech processing skill and/or other application requesting prediction by the personalization component. Accordingly, user data may be protected while providing recommended candidate actions for a particular skill and/or other application.

In another example, instead of content, candidate actions may comprise actions that a skill may be effective to take such as generation of executable instructions usable to control one or more other devices (e.g., an instruction to turn lights on or off, etc.).

As used herein, skill data schema may refer to metadata describing a structure and/or other type of organization of data related to the skill (e.g., metadata describing a description field of the movie may comprise a textual description of the movie, metadata describing a genre field may include text describing the genre(s) of the movie, etc.). Skill data schemas may include metadata related to candidate action data of the skill. For example, metadata may include an identification of a device to which an action pertains, a description of the action, a description of the content related to the skill, a description of the organizational structure of the content and/or actions, etc.

Storage and/or use of data related to a particular person or device (e.g., contextual data and/or any personal data) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not technically subject to them, to bolster user trust. For example, personal, contextual, and other data described herein may be treated as if it fell under acts and regulations, such as the Health Insurance Portability and Accountability Act (HIPAA) and the General Data Protection Regulation (GDPR), even if it does not actually fall under these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A speech-controlled computing system may respond to user utterances by outputting content and/or performing one or more other actions, such as playing music, providing information, calling a taxi, displaying an image, etc. Generally, input data received by the various speech processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

In various examples, skills may be developed by different entities relative to the entities providing the speech processing system (e.g., relative to the entity providing statistical NLU processing, ASR, etc.). In various examples, skill developers may desire to employ machine learning models to determine, classify, and/or rank content and/or other candidate actions that are likely to be of interest to users of skills developed by the developer. For example, a music skill may be configured to use one or more machine learning models to determine a ranked list of artists that may be of interest to a particular user of the music skill. In various examples, the music skill developer may desire that the ranked list of artists generated by the one or more machine learning personalization models depending on preferences and/or past activity associated with the user profile, contextual data, the type of speech processing enabled device interacting with the skill, etc. Provided herein are technical solutions for improving and optimizing the development and training of machine learning personalization models, particularly for a large number of resource-constrained skills.

Accordingly, described herein are systems and techniques whereby the speech processing system may offer machine learning personalization models to skills without requiring the skill developer to define, train, and/or maintain the model and without requiring any specialized knowledge or understanding of the machine learning techniques used. Additionally, data collection, feature computation, feedback generation and generation of training data, model-building, model-updating, model deployment, etc., may be implemented by a personalization component without requiring a skill or other application to store, manage, and/or maintain such data. Advantageously, user profile data that may be used during prediction by the personalization component may not be exposed to the requesting skill and/or other application.

As described in further detail below, a personalization component may be included in the speech processing system and/or may be a separate component configured to be in communication with the speech processing system. The personalization component may expose one or more application programming interfaces (APIs). Through the one or more APIs (e.g., one or more registration APIs), the skill developer may register the skill(s) for which machine learning personalization models are to be deployed. Registration of a skill may comprise specifying prediction requirements (e.g., specifying a prediction type using prediction type data, such as data specifying classification, ranking, etc.). In response to the receipt of the prediction type data, the personalization component may specify a subset of model properties and features. For example, a specified prediction type of "ranking" may set a specific machine learning model algorithm (e.g., logistic regression) and/or optimization metric (e.g., "precision @ K", etc.). The skill developer may provide a skill data schema to the personalization component through the one or more APIs. The skill data schema may comprise an organization and/or structure of the content data (e.g., skill-specific data) used by the skill. For example, the skill data schema may comprise a number of fields including a list of the content and/or candidate actions to be ranked (e.g., an unranked list of content) and/or content and/or candidate actions to be classified along with metadata describing the content and/or candidate actions. In some examples, a skill may provide a catalogue of the data used by the skill. For example, for a recipe ranker, the skill may provide catalogue data that includes each recipe of the skill. Features for such catalogue data (e.g., corpus data) may in some cases be precomputed prior to building and/or deployment of a machine learning model by the personalization component.

In an example, a movie skill may provide a skill data schema comprising a list of movie titles and/or image data representing the list of movie titles. Metadata for each movie title may comprise an indication of the genre, one or more actors in each title, release data, movie studio, time length, a current rating of the movie (e.g., from a movie review website), etc. Upon receipt of the skill data schema, the personalization component may map the skill data schema to a set of attributes. Features may be derived from the set of attributes through a feature ontology. For example, the skill data schema may include a field entitled "description". The description field may be mapped to the "text" attribute, and "term frequency" (among others) may be selected as a feature of the attribute. In another example, a skill data schema may be related to a movie skill. An attribute of the schema data may be a particular field of the schema (e.g., the field "genre"). A feature may determine the number of times that a particular user device (e.g., a particular speech processing enabled device) has requested a particular genre within the last 7 days. Generally, an attribute may refer to some subset of the raw source data of the schema. Generation of a feature may use attribute data and/or other available data (e.g., contextual data from speech processing, precomputed offline data, catalogue data, etc.) to perform a predefined operation to compute the feature. In various examples, feature data may be a vector representation (and/or a feature map representation) of the data described by the feature.

In addition to the skill data schema and the features generated therefrom, the personalization component may retrieve data from the speech processing system and may use the data to compute global features (e.g., features that are the same across two or more skills or across all skills for which personalization component 122 is employed). For example, the personalization component may retrieve contextual data describing a context of a user command (e.g., the time, the previous user request, the day of the week, the location of the device, etc.). The personalization component may retrieve user profile data related to user preferences and/or user feedback. In various examples, user profile data may be associated with one or more devices (e.g., a speech-processing enabled device). The personalization component may retrieve device data related to the speech processing enabled device with which the user is interacting. The personalization component may use the data retrieved from the speech processing system to compute global features that may be used across multiple models for different skills.

The personalization component may store a "Feature Definition" for each computed feature. The Feature Definition may specify the source data (e.g., the skill data schema, a contextual data service of the speech processing system, etc.), the attribute that the feature is derived from, and the function(s) that computes the feature from the attribute. Feature Compute may be a function used by the personalization component to compute and retrieve both runtime (online) and pre-computed (offline) features. Additionally, as explained in further detail below, Feature Compute may maintain the parity between online and offline features.

In various examples, the personalization component may use Feature Compute to generate labels for model training based on user feedback (e.g., based on user interaction with the ranked list or other output content) that indicates a degree of user satisfaction with the suggested and/or output content. For example, user feedback may include user data provided by the speech processing system indicating that the user interrupted playback of a title (indicating user dissatisfaction). Accordingly, a label indicating user dissatisfaction may be associated with the set of input features that resulted in the output content and may be stored in memory as training data.

The prediction service may use such training data to generate training instances of the model, and may optimize the models based on desired metrics. In various examples, multiple different models may be trained simultaneously for the same skill. The model or models that perform the best (according to the metric) may be promoted and deployed for runtime (online) prediction. For example, performance evaluation data may be tracked for each model according to a specified performance metric (e.g., "precision @ k", etc.). The model with the best performance data (and/or the models that exceed a specified performance level) may be promoted and either further evaluated or deployed for online prediction. For example, model A may have a better precision @ k score relative to model B. Accordingly, model A may exhibit enhanced performance relative to model B and may be promoted/deployed over model B. Online prediction may use the promoted machine learning model artifact and may use Feature Compute to retrieve online features in order to generate predictions (e.g., a ranked list and/or classification). The output of the machine learning model artifact (e.g., the ranked list) may be sent to the requesting skill (or skills) for which the model was deployed. In various examples, models may be refreshed through retraining (e.g., periodic scheduled retraining). Additionally, in some examples, the quality of the retrained models may be monitored (e.g., the performance of the model according to a desired metric) before deploying the retrained models to replace the existing model.

In general, data for any speech processing skill may be isolated from the data for any other skill. For example, feature definitions for a first skill from a first developer may be separate from and inaccessible by a second skill from a second developer. However, optionally, if a single developer desires to use the personalization component described herein for multiple skills controlled by the developer, data may be shared among multiple skills in order to improve the performance of the various models employed. As used herein, "content data" refers to data describing content that is sent between the various devices and operated on by the various devices described herein. Content data represents underlying "content" (e.g., audio works, video, audible responses, services) that may be provided to users of a speech processing skill.

In various further examples, user permissions data may be stored by a component of skill computing device(s) 125, speech processing device(s) 120, computing device(s) 102, and/or speech processing enabled devices 110. User permissions data may control access to and/or availability of data related to a particular user and/or a particular speech processing enabled device 110. In various examples, access to contextual data, user data, device data, speech processing data, and the like, may be controlled and/or prevented based on user permission data.

In various examples, timestamps may be associated with the output of content by a speech processing enabled device with which the user is interacting. For example, an image related to a particular skill may be output by a speech processing enabled device at time $t_0$. In various examples, a user may interact with the content either while the content is being output (e.g., displayed and/or during audio playback) or within a short amount of time after the content is output. For example, a user may interact with the image related to the particular skill by selecting a graphical control element related to the skill that is displayed on a touchscreen display. In another example, the user may interact with content by speaking a request that a skill related to currently or recently displayed content take a particular action. Accordingly, timestamp data may be used to associate user feedback (e.g., feedback data) with particular content that has been output by a speech processing enabled device and/or has been predicted to be of interest using the personalization component described herein.

As previously described, in at least some examples, a "skill," "skill component," and the like may be software that is run by a third party to the herein disclosed speech processing system (e.g., a 3P skill developer), without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

FIG. 1 is a diagram of an example system configured to provide a personalization for speech processing applications, according to various embodiments of the present disclosure.

As shown in FIG. 1, the system 100 includes a speech processing enabled device 110. Generally, a speech processing enabled device 110 may be a device that allows a user to interact with a speech processing system. In some examples, the speech processing system may be implemented in whole or in part by the speech processing enabled device (e.g., using computing resources of speech processing enabled device 110). However, in some other examples, the speech processing system may be implemented in whole or in part by other speech processing computing device(s) 120 that are configured in communication with speech processing enabled device 110 (e.g., over network 104).

Speech processing enabled device 110 may comprise speakers and audio circuitry effective to output audio. Additionally, speech processing enabled device 110 may comprise one or more microphones effective to capture audio, such as spoken user utterances. In various examples, speech processing enabled device 110 may include a display effective to display images and/or video data. However, in some other examples, speech processing enabled device 110 may not include an integrated display. Speech processing enabled device 110 may include communication hardware effective to allow speech processing enabled device 110 to communicate with one or more other computing devices over a network 104. In various examples, network 104 may represent a local area network (LAN) and/or a wide area network (WAN) such as the internet. Speech processing enabled device 110 may be effective to communicate over network 104 with speech processing computing device(s) 120. As described in further detail below, speech processing computing device(s) 120 may form a speech processing system that may perform various speech processing techniques in order to semantically interpret and/or perform actions in response to user speech detected by speech processing enabled device 110.

For example, a user of speech processing enabled device 110 may utter the audible request: "Computer, what is the current weather in Seattle, Washington?" One or more microphones of speech processing enabled device 110 may generate electrical signals corresponding to the spoken request and may encode and send such signals over network 104 to speech processing computing device(s) 120. Speech processing computing device(s) 120 may perform ASR to generate text data representative of the audible request. NLU may be used to generate one or more semantic interpretations of the text data. As described in further detail below, the NLU may determine one or more slots and/or intents that may correspond to one or more actions that may be taken in response to the spoken command. In various examples, the results of the NLU processing may be sent to a skill computing device(s) 125. The skill computing device(s) 125 may be effective to generate an instruction that may be effective, when executed by speech processing enabled device 110, to cause speech processing enabled device 110 to perform an action. For example, the skill computing device(s) may be effective to generate instructions effective to cause speech processing enabled device 110 to retrieve and display an image (or audio) describing the current weather for Seattle, Washington. The instructions may be sent to, and executed by, speech processing enabled device 110 in order to output the requested content by speech processing enabled device 110.

As previously described, a skill developer (e.g., a 1P or 3P skill developer controlling a skill executing on skill computing device(s) 125) may desire to employ a machine learning model to improve the predictive capability and/or quality of results provided by the skill in response to user requests. However, in at least some examples, the skill developer may not have the expertise, resources, and/or desire to implement the machine learning model themselves. Accordingly, the skill developer may use personalization component 122 to automatically implement a machine learning model trained for use with a skill designated by the developer.

Personalization component 122 may be executed by computing device(s) 102. Computing device(s) 102 may be a service of the speech processing system implemented by speech processing computing device(s) 120 (and may therefore, in some cases, be considered part of the speech processing system). However, in some other examples, personalization component 122 may be implemented separately from the speech processing system. In such examples, computing device(s) 102 may be effective to communicate over network 104 with speech processing computing device(s) 120 (e.g., through one or more APIs of speech processing computing device(s) 120).

The skill developer may register a skill with personalization component 122 using a registration request. During registration, the skill developer may send various data to personalization component 122 (e.g., over network 104) through API(s) 154. In some examples, the skill developer may specify prediction requirements to the personalization component. Prediction requirements may include specification of the desired output of the machine learning model to be deployed by personalization component for use with the skill (or skills) that the developer is registering. For example, a skill developer may specify that content should be ranked or that content should be classified. In response to the receipt of the prediction requirements, the personalization component 122 may specify a subset of model properties and features. For example, a specified prediction type of "ranking" may set a specific machine learning model algorithm (e.g., logistic regression) and/or optimization metric.

The skill developer may provide a skill data schema 138 to the personalization component 122 through the one or more APIs 154. The skill data schema 138 may comprise a list of the content to be ranked and/or content to be classified along with metadata describing the content. For example, if the pertinent skill is a music service, the skill data schema 138 may comprise a list of songs and/or a list of music artists. In this example, metadata of the skill data schema may include an indication of the genre, a record label, song length, etc. Additionally, skill data schema 138 may refer to metadata describing one or more candidate actions for the pertinent speech processing skill. For example, metadata of skill data schema 138 may describe metadata related to movies that a movie skill can output, metadata related to songs that a music skill can output, metadata related to devices that a device-control skill may be used to operate, etc. In general, skill data schema 138 may be metadata describing any data operated on by the skill, used by the skill during prediction, and/or output by the skill.

Personalization component 122 may determine features 156 using the skill data schema 138. For example, the skill data schema may be mapped to a set of attributes of the data. Features may be derived from the set of attributes using a feature ontology. Definitions of features may be stored as a "Feature Definition" in network-accessible memory 103 (sometimes referred to herein as "memory 103"). The Feature Definition may specify the source data from which the feature was computed, the attribute that the feature is derived from, and the function(s) that is used to compute the feature from the attribute. Memory 103 may be a non-transitory computer-readable memory effective to store data. Additionally, memory 103 may store instructions, that when executed by at least one processor of computing device(s) 102, are effective to program the at least one processor to implement personalization component 122.

In addition to the skill data schema 138 and the features generated therefrom, the personalization component 122 may retrieve speech-processing data 155 from the speech processing system (e.g., from speech processing computing device(s) 120) and may use the data to compute global features. Speech-processing data 155 may comprise contextual data 142, user data 144, device data 146, etc. For example, the personalization component 122 may retrieve contextual data 142 describing a context of a user command (e.g., the time, the previous user request, the day of the week, the location of the device, etc.). The personalization component 122 may retrieve user data 144 (e.g., user profile data) related to user preferences, user interaction with a skill, and/or user feedback. The personalization component may retrieve device data 146 related to the speech processing enabled device with which the user is interacting. The personalization component 122 may use the data retrieved from the speech processing system to compute global features that may be used across multiple models for different skills. Features 156 may comprise both global features computed using data from speech processing computing device(s) 120 (as described above) and features computed using content received from the relevant skill according to the Feature Definition determined during skill registration (e.g., in response to receipt of the skill data schema 138 and the specification of prediction requirements by the skill developer).

Personalization component 122 may generate personalization model 180 for the registered skill(s). Personalization model 180 may be a machine learning model configured to perform the particular prediction task specified by the skill developer during registration of the skill(s). Although a single personalization model 180 is depicted in FIG. 1, in various examples, several models may be used. For example, several machine learning models (e.g., models of different architectures employing different algorithms) may be deployed by personalization component 122. The models that perform the best (according to one or more metrics) may be promoted and may be deployed for run-time (online) inference.

Speech processing systems (e.g., a speech processing system implemented by speech processing computing device(s) 120 and/or skill computing device(s) 125) may answer user commands requesting the output of content and/or may recommend content without receipt of a user request. In various examples, in order to interpret a request, the NLU component of a speech processing system may have access to contextual data 142. Contextual data 142 may be factual information (e.g., factual data) contextualized to a particular entity. An entity may be a particular device ID, a particular IP address, an account ID, a request ID, etc. For example, a user may speak the request, "Computer, what is the score of the football game?" The speech processing system may have access to contextual data 142 related to the device ID (e.g., an identifier of speech processing enabled device 110). For example, the speech processing system may access contextual data 142 indicating that the device ID is registered to an address in Seattle, Washington. In the example, the speech processing system may use this contextual information to determine that the user is requesting the score of the local Seattle football team. By contrast, global information may be information that is the same regardless of any particular entity. For example, the speed of light in vacuum is 299,792,458 meters per second. The speed of light in vacuum is an example of global information. By contrast, a particular person's favorite song is contextual data related to that particular person.

Contextual data 142 concerning speech processing enabled device 110 may be provided to personalization component 122 and may be used to compute global features of features 156, as described above. Contextual data 142 may be related to a user request, may be related to the particular speech processing enabled device, and/or may be related to the content output by speech processing enabled device 110 and/or interacted with by a user. For example, contextual data 142 may comprise data indicating that it is Monday, Mar. 18, 2019 at 7:13 am. Contextual data 142 may further indicate that speech processing enabled device(s) 110 are located in Tucson, Arizona.

User data 144 may be data representing a user or group of user's. For example, user data 144 may be user profile data associated with a particular user profile and/or account. For example, speech processing enabled device 110 may comprise one or more cameras effective to capture video of the environment surrounding speech processing enabled device 110. Computer vision techniques may be used to identify one or more users currently within a field-of-view of the camera(s). Data representing the identities of the users may be used by personalization component 122 to provide the content that is most likely to be of interest to the particular user(s) based on the user identity. In various other examples, voice recognition may be used to identify users. As previously described, privacy controls may be employed by the user(s) to limit the amount of personal data captured and/or used by speech processing enabled device 110. Additionally, while user data 144 may be used during prediction by personalization component 122, user data 144 may not be exposed to a requesting skill. For example, user identification techniques may be selectively disabled and enabled according to user preference. User data 144 may optionally comprise other data related to a user profile/account. For example, user data may indicate preferred sports teams, preferred music, preferred update style, preferred frequency of updates, preferred user routines (e.g., announce upcoming calendar appointments, followed by weather forecasts for the day, followed by current stock prices of stocks owned by the user), etc. In various examples, some of the foregoing information may also be described as contextual data 142 related to the user. Accordingly, contextual data 142 and user data 144 may be at least partially overlapping data sets and at least some data belonging to one set may properly be described as belonging to the other.

User data 144 may be provided to personalization component 122 and may be used to compute global features of features 156, as described above. In various examples, user data 144 may comprise indications of user satisfaction/dissatisfaction with the output of content by speech processing enable device 110. For example, a user may interrupt playback of content by speech processing enabled device 110. Such an interruption may indicate user dissatisfaction with the content. Accordingly, data indicative of the user dissatisfaction may be stored in memory 103 in association with the input feature data (e.g., features 156) used during runtime to generate the content (e.g., content output by personalization model 180). The input feature data along with the label indicating user satisfaction/dissatisfaction may be used to train and generate further training instances of the personalization model 180. In another example, user data 144 may include an indication that a user requested a particular content item that was output in a ranked list by personalization model 180. The indication that data in the ranked list was selected by the user may be stored in memory 103 (e.g., in association with the input features 156 that were used to generate the ranked list by personalization model 180) and may be used to train and generate further training instances of the personalization model 180.

Device data 146 may be data pertaining to speech processing enabled device 110. For example, device data 146 may comprise an indication of a device type, a device identifier, device settings (e.g., privacy settings, display settings, speaker settings, etc.). Additionally, device data 146 may comprise location data (e.g., geographical location and/or local location). The local location of a particular device may be, for example, a room in which the device is situated (e.g., living room, bedroom, kitchen, garage, etc.). Geographical location may be explicitly provided by a user (e.g., through a companion application) or may be determined based on IP address and/or geo-location data provided by speech processing enabled device 110. Local location data may be provided explicitly by the user, or may be determined based on pattern matching with speech processing enabled devices with explicitly known locations.

Device data 146 may further comprise indications of selections made using non-speech interfaces of the speech processing enabled device 110. For example, a user may select an image on a touchscreen display of speech processing enabled device 110. Device data 146 may include an indication of the touch input. Optionally, the device data 146 may also comprise an indication of displayed content associated with the touch input. In various examples, some of the foregoing device data may also be described as contextual data related to the user. Accordingly, contextual data 142 and device data 146 may be at least partially overlapping data sets and at least some data belonging to one set may properly be described as belonging to the other.

Device data 146 may be provided to personalization component 122 and may be used to compute global features of features 156, as described above.

Skill computing device(s) 125 may provide a request (e.g., request data 152) through API(s) 154 to personalization component 122. Request data 152 may be a request for a ranking of content, a classification of content, or the like, according to the prediction requirement specified by the skill developer when registering the skill(s). After feature definition and initialization of personalization model 180, personalization model 180 may initially be configured to generate the "same result" as the pertinent skill would have output without the use of personalization component 122. For example, if Skill A would rank content A, B, and C in the following order: [B, C, A], personalization model 180 may initially rank content A, B, and C in the same order and may provide the ranked list back to Skill A (e.g., executing on skill computing device(s) 125). Skill A may then interact with speech processing computing device(s) 120 to output the ranked list (e.g., via a speaker of speech processing enabled device 110).

Personalization component 122 may collect feedback data (e.g., contextual data 142, user data 144, and device data 146) including indications of user interaction, satisfaction, and/or dissatisfaction with respect to predicted content output by personalization model 180. As described above, such content may be stored in memory 103 and used as training data to retrain the personalization model 180. In various examples, personalization model 180 may be retrained when a sufficient number of training examples have been stored in memory 103. The amount of time required to generate a sufficient amount of training data (e.g., a threshold number of labeled training examples) may depend on the number of users interacting with the relevant skill per unit time.

Personalization model 180 may be any type of machine learning model, depending on the specified prediction requirement provided by the skill developer during skill registration through API(s) 154. For example, personalization model 180 may comprise a layered architecture with each layer comprising a number of neurons storing activation values. Parameters (e.g., "weights") may control activations in neurons (or nodes) within layers of the personalization model 180. For example, the weighted sum of activations of each neuron in a preceding layer may be input to an activation function (e.g., a sigmoid function and/or rectified linear units (ReLu) function). The result may determine the activation of a neuron in a subsequent layer. In addition, a bias value may be used to bias the output of the activation function toward activation (or inactivation).

Generally, in machine learning models, after initialization, annotated training data, such as the training data described above stored in memory 103, may be used to generate a cost or "loss" function that describes the difference between expected output of the machine learning model (e.g., the known label of the training data) and actual output in the output layer of the model. The parameters (e.g., weights and/or biases) of the machine learning model may be updated to minimize (or maximize) the cost. For example, the machine learning model may use a gradient descent algorithm to incrementally adjust the weights to cause the most rapid decrease (or increase) to the output of the loss function, depending on the desired training objective. As previously described, personalization component 122 may iteratively train personalization model 180 whenever a suitable amount (e.g., a threshold amount) of training data has been accumulated in memory 103.

Once the personalization model 180 satisfies one or more performance metrics (e.g., after training the personalization model 180 with accumulated training data stored in memory 103), the personalization model 180 may be deployed for use in online prediction for the relevant content. For example, once the average cost for a set of training data is below a threshold or target cost value, the personalization model 180 may be deployed. Upon deployment, personalization model 180 may no longer provide the "same result" as the content nominally generated by the skill in response to a request.

In an example of online operation, after deployment of a personalization model 180 configured to rank content, a skill may receive intent data and/or slot data representing a user request to output content. The skill may generate a list of the content according to the logic and/or models employed by the particular skill. The skill computing device(s) 125 may send the request data 152 comprising the list of unranked content to personalization component 122 through API(s) 154. Personalization component 122 may use Feature Definition and Feature Compute to extract features 156 from the unraked content (e.g., feature vectors representing the unranked content). Additionally, personalization component 122 may receive contextual data 142, user data 144, and/or device data 146 from speech processing computing device(s) 120. Personalization component 122 may generate features 156 representing contextual data 142, user data 144, and/or device data 146. In general, the features 156 computed may be dependent on the design of the personalization model 180. For example, the personalization model 180 may take as input various different features representing the unranked content received from the registered skill as well as one or more global features representing contextual data 142, user data 144, and/or device data 146.

The personalization model 180 may take features 156 as input and may generate an output encoding a ranked list of content (in the current "ranker" example). The ranked list of content may be sent as model output 185 to the requesting skill executing at skill computing device(s) 125. Optionally, the skill may perform post-processing on the ranked list, as desired (e.g., reordering of the ranked list, exclusion of various content, inclusion of various additional content, etc.). Thereafter, the skill may interact with the speech processing system (e.g., speech processing computing device(s) 120) to output the content. For example, a text-to-speech component of speech processing computing device(s) 120 may be used to convert text of the ranked list of content to audio data. The audio data may be sent to speech processing enabled device 110 for playback.

Figure 2:
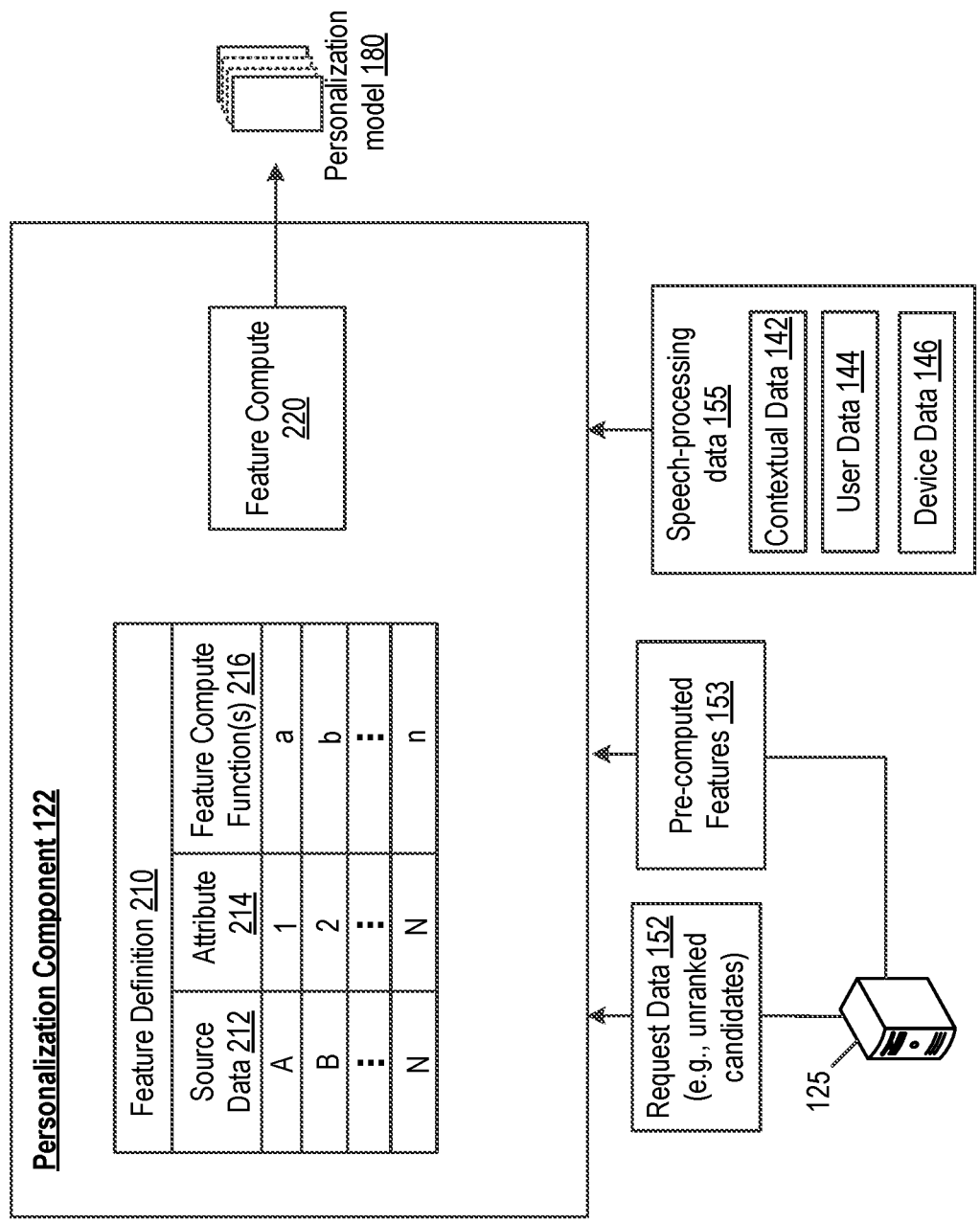
FIG. 2 is depicts an example of feature extraction by a personalization for speech processing applications, according to various embodiments of the present disclosure.

FIG. 2 is depicts an example of feature extraction by personalization component 122 for speech processing applications (e.g., by a skill executing on skill computing device(s) 125), according to various embodiments of the present disclosure. In various examples, personalization component 122 may comprise feature definition 210. Feature definition 210 may be a data structure storing various data related to features used for input and/or as training data for training personalization models, such as personalization model 180. In various examples, feature definition 210 may be stored in a memory, such as memory 103 described above in reference to FIG. 1.

In the example depicted in FIG. 2, feature definition 210 includes the fields source data 212, attribute 214, and feature compute function(s) 216, although in various other examples additional and/or fewer fields may be used according to the desired implementation. Source data 212 may store indications of the source of raw data received by personalization component 122. Raw data may include data received by personalization component 122 for which features have not yet been computed/extracted. For example, personalization component 122 may receive a list of unranked and/or unclassified content from a skill that has registered with personalization component 122 (e.g., a skill executing on skill computing device(s) 125). Additionally, personalization component 122 may receive metadata associated with and/or describing the received content. Source data 212 may indicate the source from which the data was received. Example sources may include registered skills, speech processing computing device(s) 120 (e.g., the speech processing system), components of the speech processing system (e.g., a contextual data service of the speech processing system), device data related to speech processing enabled device 110, user data, etc. Source data 212 may describe a source of metadata describing one or more candidate actions of a skill and/or a source of metadata describing one or more items of content of a skill.

Attribute 214 may be a field storing information indicating an attribute or, more generally, an aspect of the raw data for which feature data is to be computed. Attributes may represent any desired aspect of the source data. For example, if the source data includes address data, the attribute may be 5 digit zip codes. In another example, if the source data includes movie descriptions, the attribute may be text of the description. The foregoing examples of attributes are for illustrative purposes only. It should be appreciated that there are many different examples of attributes describing various facets of raw source data that may be used to compute features according to the desired implementation.

Feature compute function(s) 216 (sometimes referred to herein as "function data") may be one or more functions used by feature compute 220 to compute an output feature (e.g., a feature vector of feature map) from attribute date. For example, feature compute 220 may determine the source of the data from source data 212 field and may determine the attribute from attribute 214 field. Feature compute 220 may use the one or more associated feature compute function(s) 216 to generate the features for input into personalization model 180. For example, if the attribute is the zip code of address data, the feature compute function may determine the first 3 digits of the zip code as a feature vector. In another example, if the attribute is text of a movie description, the feature may be the number of times that a particular word or phrase appears within the text.

Upon receiving a request for prediction using the personalization model 180 (e.g., an online prediction request received through API(s) 154), features may be computed by feature compute 220 according to feature definition 210 from raw data (e.g., request data 152, contextual data 142, user data 144, and/or device data 146). Personalization model 180 may generate an output according to the particular model algorithm being used (e.g., a ranked list, a prediction, a classification, etc.). Feature definition 210 may ensure that features are computed the same way in both online (runtime) and offline (model-building) phases. Accordingly, feature parity may be maintained between online and offline scenarios.

In various other examples, other types of data may be received by personalization component 122. For example, embedding values may be determined for each input feature and the embedding values may be stored as features. In various other examples, pre-computed features 153 may be determined and stored in feature definition 210. In at least some examples, per-computed features may represent the popularity of particular candidates over a given time period and/or historical data related to a particular piece of content. Such pre-computed features may be stored in a field in feature definition 210. Feature compute 220 may use such features as input to the personalization model 180. For example, feature compute 220 may determine the dot-product of a pre-computed feature 153 and a feature computed using source data 212, attribute data 214, and feature compute function(s) 216.

Figure 3:
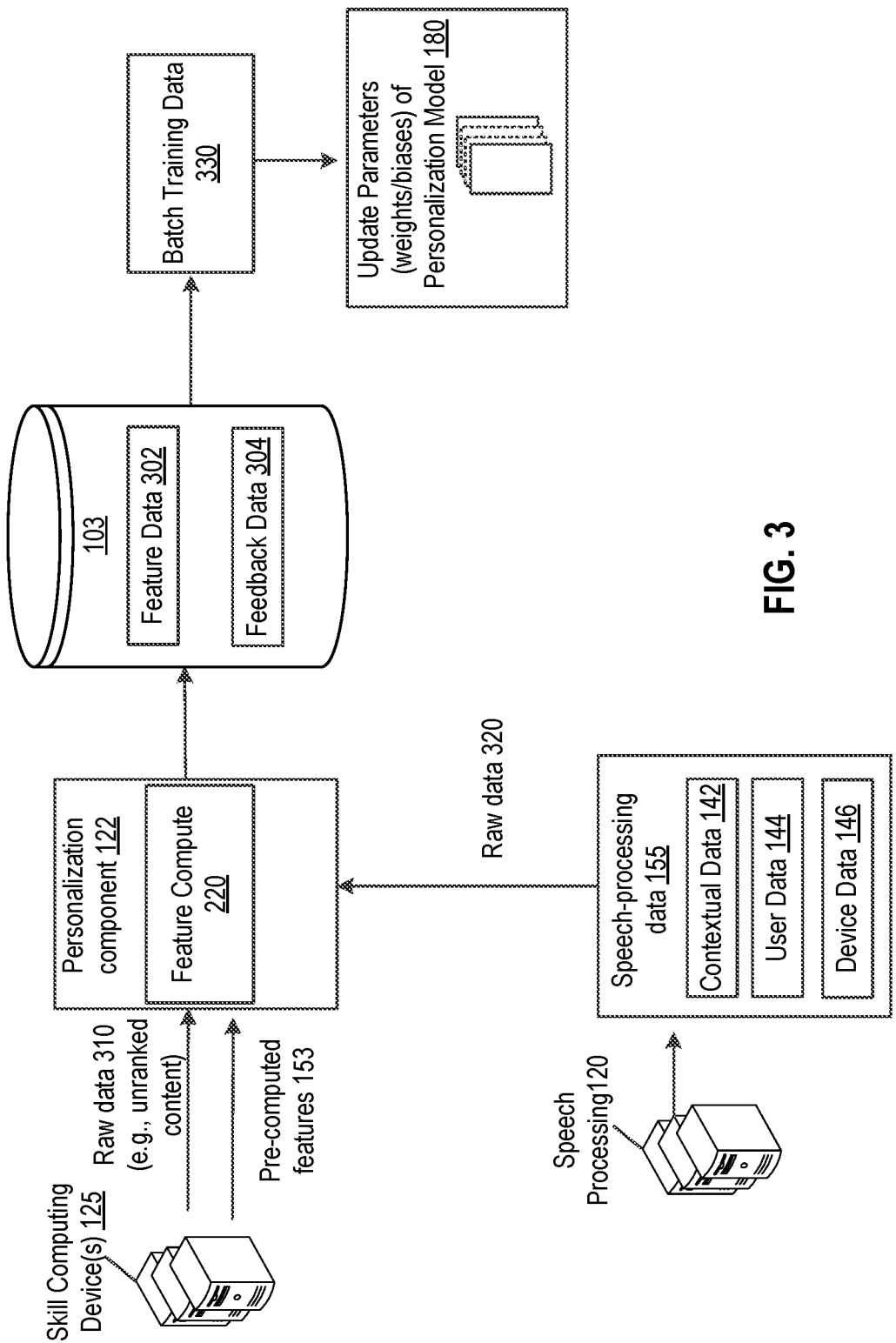
FIG. 3 is a conceptual diagram illustrating techniques that may be used to train a machine learning personalization model for a speech processing application, in accordance with various embodiments described herein.

FIG. 3 is a conceptual diagram illustrating techniques that may be used to train a personalization model 180 for a speech processing application, in accordance with various embodiments described herein. Those components of FIG. 3 that have been previously described in reference to FIGS. 1-2 may not be described again herein for purposes of clarity and brevity.

In various examples, personalization component 122 may receive raw data 310 (e.g., unranked content) from a skill executing on skill computing device(s) 125 (e.g., a skill that has invoked personalization component 122). As previously described, personalization component 122 may use feature definition 210 and feature compute 220 to determine feature data 302. Feature data 302 may, in turn, be stored in memory 103 and may be used for prediction and/or training.

In various examples, personalization component 122 may receive raw data 320 including feedback data 304 from speech processing computing device(s) 120. Feedback data 304 may be representative of user satisfaction/dissatisfaction with the output of personalization model 180 that is sent to and output by speech processing enabled device 110. For example, feedback data 304 may be data representing user selection of a particular content item that was among content in a ranked list output by personalization model 180. In another example, feedback data 304 may represent a user interrupting playback of content that was among the content in the ranked list. In another example, feedback data 304 may represent a user requesting a different content item apart from the content in the ranked list. In another example, feedback data 304 may represent a user utterance praising or expressing excitement concerning content that has been suggested in the ranked list (e.g., "Computer, I love this song!"). The foregoing examples of feedback data 304 are for illustrative purposes and are not meant to be an exhaustive list. Various other examples of feedback data 304 may be used in accordance with a desired implementation.

In various examples, feedback data 304 may be transformed into a label to be stored in association with input feature data 302. For example, feature definition 210 may transform feedback data 304 into a label (e.g., data representing the feedback) in a similar manner to that described above for computation of features in the description of FIG. 2. A set of input feature data 302 along with feedback data 304 generated in response to the output of content by personalization model 180 due to input of the feature data 302 may be stored in memory 103 as a training example. In other words, the input feature data 302 may be stored in association with a label indicating user feedback. Training examples may be stored as batch training data 330. When the number of training examples in batch training data 330 is equal to or exceeds a desired amount (e.g., a threshold number of training examples), personalization model 180 may be trained and/or retrained using the batch training data 330 to generate an updated instance of personalization model 180. As known to those skilled in the art, training and/or retraining personalization model 180 may comprise updating weights and/or biases of the personalization model in order to decrease the overall cost of the batch training data 330 (e.g., the difference between the expected output and the actual output of the personalization model 180).

In various examples, if the performance of the updated personalization model 180 exceeds some performance metric (e.g., prediction accuracy, classification accuracy, etc.), the updated personalization model 180 may be deployed for the registered skill for online prediction. Thereafter, the skill may call the personalization component 122 using API(s) 154 for online prediction (e.g., in response to a user request, or in order to determine whether or not to output content to a user through speech processing enabled device 110).

Figure 4A:
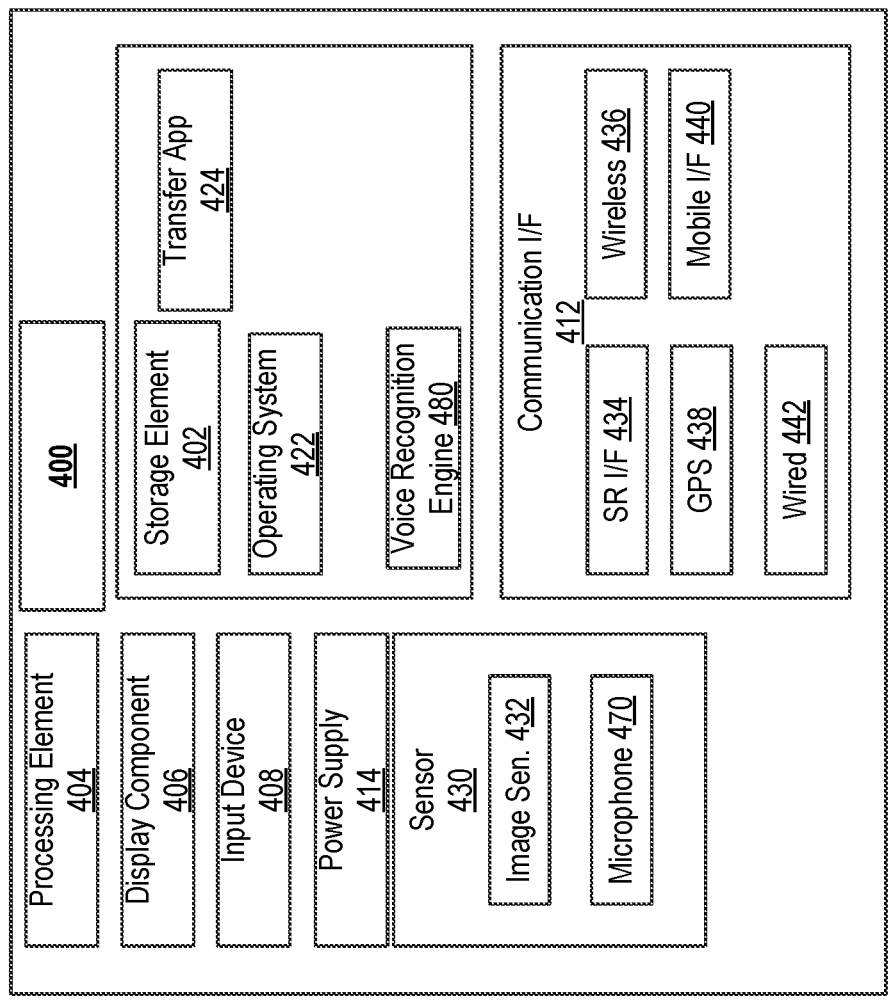
FIGS. 4A-4B are block diagrams showing example architectures of computing devices that may be used in accordance with various embodiments described herein.

FIG. 4A is a block diagram showing an example architecture 400 of a computing device (e.g., speech processing enabled device 110), in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine device data 146. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers (e.g., speech processing computing device(s) 120).

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by skill computing device(s) 125. In some examples, the content displayed by display component 406 may be among content in a ranked list provided by personalization model 180 (e.g., by personalization component 122 while in an ambient state (e.g., model output 185 of FIG. 1).

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition engine 480 may interpret audio signals of sound captured by microphone 470. In some examples, voice recognition engine 480 may listen for a "wake-word" to be received by microphone 470. Upon receipt of the wake-word, voice recognition engine 480 may stream audio to a voice recognition server for analysis, such as speech processing computing device(s) 120. In various examples, voice recognition engine 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output. An example of an image sensor 432 may be a camera configured to capture color information, image geometry information, and/or ambient light information.

Figure 4B:
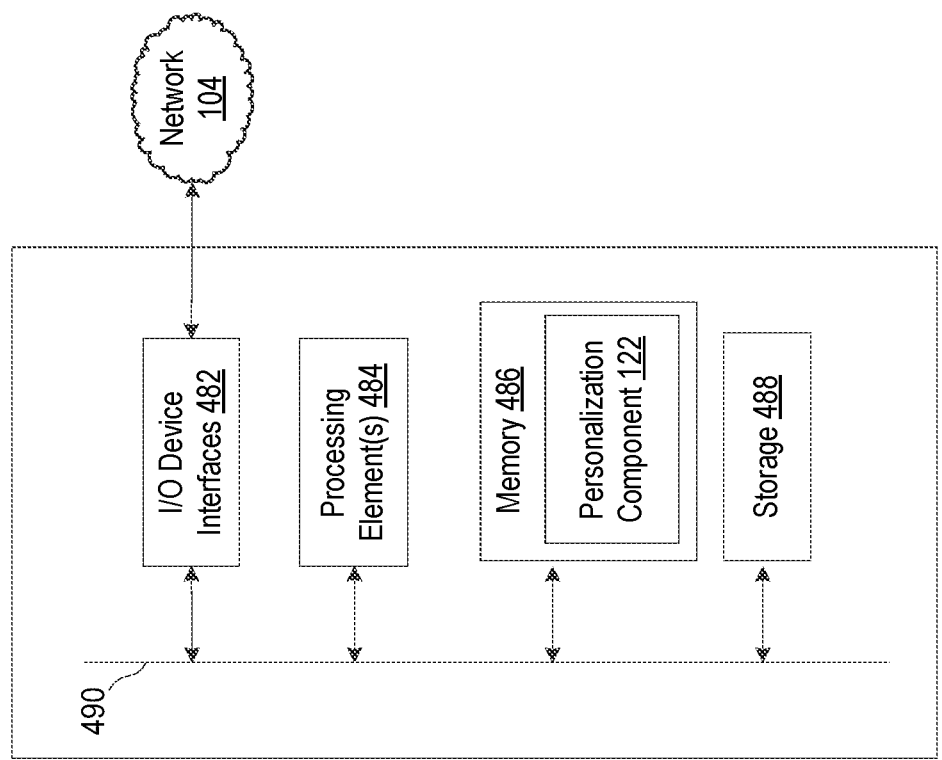

FIG. 4B is a block diagram conceptually illustrating example components of a remote device, such as the computing device(s) 102, skill computing device(s) 125, and/or speech processing computing device(s) 120, which may assist with ASR processing, NLU processing, applicable protocol recognition, skill execution, and/or command processing. Multiple computing devices 102, skill computing device(s) 125, and/or speech processing computing device(s) 120 may be included in the system, such as one speech processing computing device 120 for performing ASR processing, one speech processing computing device 120 for performing NLU processing, one or more computing devices 102 implementing personalization component 122, one or more skill computing device(s) 125 implementing skills, etc. In operation, each of these devices (or groups of devices) may include computer-readable and computer-executable instructions that reside on the respective device, as will be discussed further below.

Each of these devices (102/120/125/) may include one or more controllers/processors 484, which may each include at least one central processing unit (CPU) for processing data and computer-readable instructions, and a memory 486 for storing data and instructions of the respective device. In at least some examples, memory 486 may store, for example, a list of N-best intents data that may be generated for a particular utterance. In some examples, memory 486 may store speech processing data, contextual data 142, user data 144, and/or device data 146. In various further examples, memory 486 may be effective to store instructions effective to program controllers/processors 484 to perform the various techniques described above in reference to personalization component 122 in FIGS. 1-3. Accordingly, in FIG. 4B, personalization component 122 is depicted as being stored within memory 486. The memories 486 may individually include volatile random access memory (RAM), non-volatile read only memory (ROM), non-volatile magnetoresistive memory (MRAM), and/or other types of memory. Each device (102/120/125) may also include a data storage component 488 for storing data and controller/processor-executable instructions. Each data storage component 488 may individually include one or more non-volatile storage types such as magnetic storage, optical storage, solid-state storage, etc. Each device (102/120/125/) may also be connected to removable or external non-volatile memory and/or storage (such as a removable memory card, memory key drive, networked storage, etc.) through respective input/output device interfaces 482. In various examples, source data 212, attribute data 214, feature compute function(s) 216, personalization model 180, etc., may be stored in memory 486 and/or storage 488.

Computer instructions for operating each device (102/120/125) and its various components may be executed by the respective device's processing element(s) 484, using the memory 486 as temporary "working" storage at runtime. A device's computer instructions may be stored in a non-transitory manner in non-volatile memory 486 (e.g., a non-transitory computer-readable memory), storage 488, or an external device(s). Alternatively, some or all of the executable instructions may be embedded in hardware or firmware on the respective device in addition to or instead of software.

Each device (102/120/125) includes input/output device interfaces 482. A variety of components may be connected through the input/output device interfaces 482, as will be discussed further below. Additionally, each device (102/120/125) may include an address/data bus 490 for conveying data among components of the respective device. Each component within a device (102/120/125) may also be directly connected to other components in addition to (or instead of) being connected to other components across the bus 490.

As noted above, multiple devices may be employed in a single system. In such a multi-device system, each of the devices may include different components for performing different aspects of the system's processing. The multiple devices may include overlapping components. The components of the computing device(s) 102 and the speech processing computing device(s) 120, as described herein, are exemplary, and may be located as a stand-alone device or may be included, in whole or in part, as a component of a larger device or system.

Figure 5:
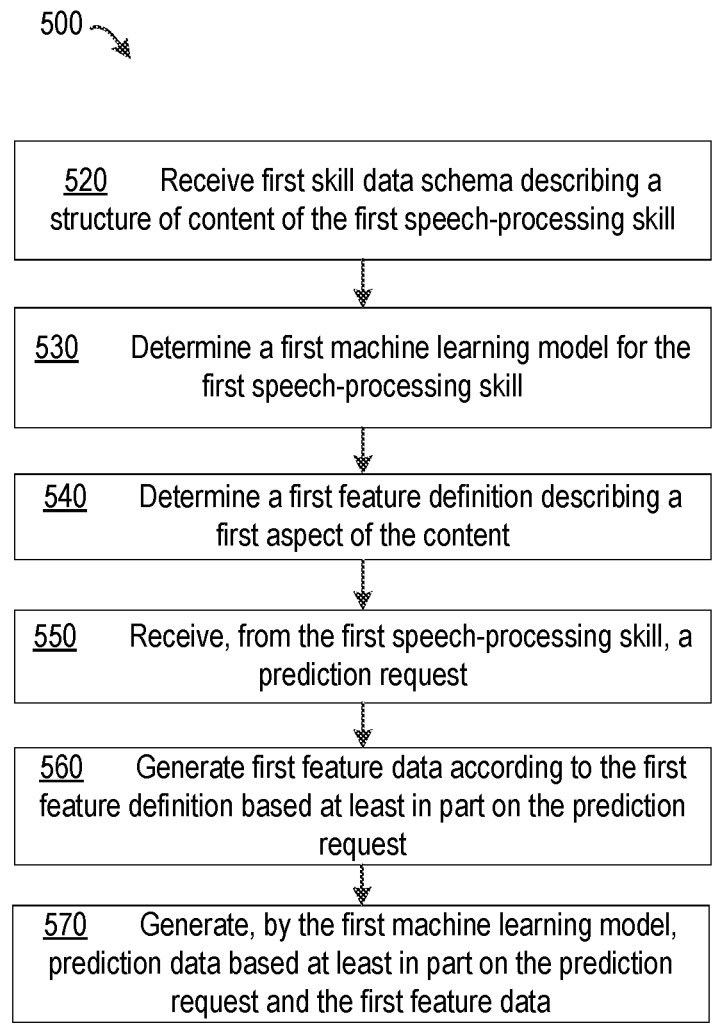
FIG. 5 depicts a flow chart showing an example process for providing content prediction to a speech processing skill, in accordance with various aspects of the present disclosure.

FIG. 5 depicts a flow chart showing an example process 500 for providing content prediction to a speech processing skill (e.g., a skill executing on skill computing device(s) 125), in accordance with various aspects of the present disclosure. Those portions of FIG. 5 that have been previously discussed in reference to FIGS. 1-4B may not be described again for purposes of clarity and brevity. The actions of the process 500 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 500 may begin at action 520, "Receive first skill data schema describing a structure of content of the first speech processing skill". In various examples, the skill computing device(s) 125 may send a skill data schema describing a structure of the content to be ranked, classified, etc., by personalization component 122.

Processing may continue from action 520 to action 530, "Determine a first machine learning model for the first speech processing skill". In various examples, personalization component 122 may determine an appropriate machine learning model for prediction. In various examples, the type of prediction (e.g., ranking, classifying, etc.) may be used to determine the model algorithm. For example, for an image classification prediction type, personalization component 122 may select a convolutional neural network (CNN) and/or another machine learning model that is suited for the particular type of prediction requested. In various other examples, the machine learning model may be selected based at least in part on the skill data schema provided.

Processing may continue from action 530 to action 540, "Determine a first feature definition describing a first aspect of the content". In various examples, personalization component 122 may determine feature definitions for input features of the selected machine learning model. Features may be selected based on the provided skill data schema and may be modified over time in order to improve performance of the model. Feature definition may be based on raw source data and attributes representing aspects of the raw source data. Any desired aspect of the raw source data may be used for feature extraction. A feature compute function(s) stored in association with an indication of the source data 212 and attribute data 214 may operate on the attribute data to generate feature data. Feature definition and computation is described above in, for example, reference to FIG. 2.

Processing may continue from action 540 to action 550, "Receive, from the first speech processing skill, a prediction request". In various examples, at action 550, skill computing device(s) 125 may request prediction for particular content. In various examples, the skill computing device(s) 125 may provide content along with the prediction request (e.g., unranked and/or unclassified content).

Processing may continue from action 550 to action 560, "Determine first feature data according to the first feature definition based at least in part on the prediction request". In various examples, at action 560, features may be determined for the first prediction request. In various examples, features may be computed based on the content provided by skill computing device(s) 125 and/or may be computed based on information received from speech processing computing device(s) 120 (e.g., contextual data 142, user data 144, and/or device data 146). In various other examples, pre-computed and/or cached features may be looked up at action 560. In still other examples, determining the first feature data may comprise performing one or more operations on pre-computed features and/or skill-specific features determined for the particular speech processing skill.

Processing may continue from action 560 to action 570, "Generate, by the first machine learning model, prediction data based at least in part on the prediction request and the first feature data". In various examples, at action 570, the machine learning model (e.g., personalization model 180) may generate prediction data (e.g., model output 185) based on the computed features. In various examples, the prediction data may be sent over network 104 to the requesting skill computing device(s) 125.

In various examples, after sending the prediction data over network 104 to the requesting skill computing device(s) 125, the pertinent requesting skill may send the list of candidate actions (e.g., content) that were selected for output by speech processing enabled device 110 back to personalization component 122. In various examples, such a list may be used during training/retraining of the personalization model 180. For example, a skill for which personalization component 122 has been invoked may receive a list of movies predicted to be of interest by personalization model 180. Thereafter, the skill may reorder the list (or may output the list as predicted by personalization model 180). For example, the skill may comprise logic to emphasize particular movie titles over others. The skill may send the list of content actually output (e.g., displayed or played back) to personalization component 122 so that personalization component 122 may thereafter use the content to train personalization model 180 in order to form better predictions.

Figure 6:
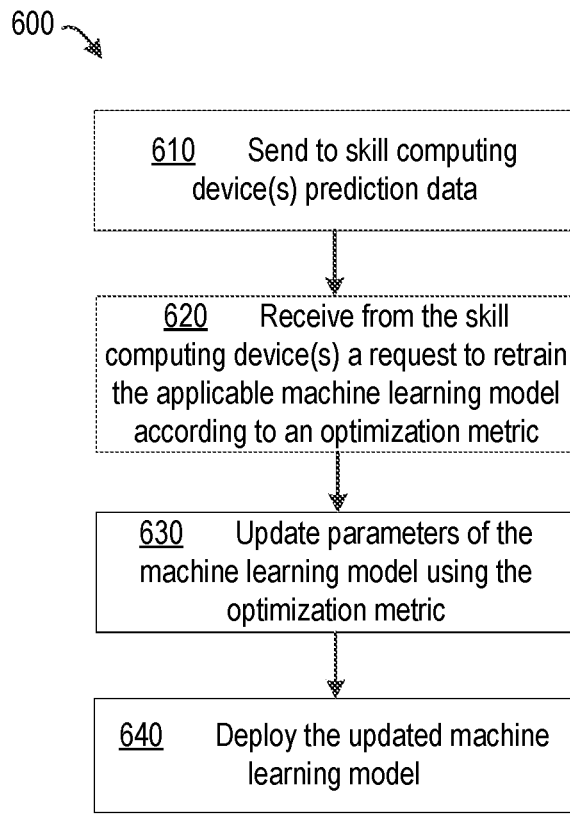
FIG. 6 depicts a flow chart showing an example process for retraining a machine learning personalization model in response to a request from a speech processing skill, in accordance with various aspects of the present disclosure.

FIG. 6 depicts a flow chart showing an example process 600 for retraining a machine learning personalization model in response to a request from a speech processing skill, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 600 may begin at action 610, "Send to skill computing device(s) prediction data". At action 610, personalization component 122 may send prediction data (e.g., model output 185) to skill computing device(s) 125. Prediction data may comprise, for example, a ranked list of content related to the skill executing on skill computing device(s) 125.

In some examples, process 600 may proceed from action 610 to action 620, "Receive from the skill computing device(s) a request to retrain the applicable machine learning model according to optimization metric data". At action 620, skill computing device(s) 125 may send a request to retrain the applicable machine learning model according to optimization metric data provided by the skill computing device(s) 125. In various examples, the skill developer may have access to the prediction results received from personalization model 180. The skill developer may perform A/B testing based on the results provided and/or based on one or more other improvements that the skill developer may have implemented at skill computing device(s) 125. In response to the A/B testing and/or in response to the prediction data returned by personalization component 122, the skill developer may desire to retrain the model (e.g., according to an optimization metric). For example, the skill developer may want to emphasize particular types of content over other types of content. In another example, the skill developer may have made changes to the skill data schema. Accordingly, the skill developer, through skill computing device(s) 125 may send a request to personalization component 122 to retrain the applicable machine learning model according to the optimization metric data.

Process 600 may proceed from action 620 to action 630, "Update parameters of the machine learning model using the optimization metric". At action 630, personalization component 122 may retrain the personalization model 180. For example, using the optimization metric, different features may be defined and computed and a new cost function may be generated. Weights and biases (e.g., parameters) of the personalization model 180 may be updated during retraining.

Process 600 may proceed from action 630 to action 640, "Deploy the updated machine learning model". At action 640, upon retraining the personalization model 180, personalization component 122 may deploy the updated machine learning model. For example, the personalization component 122 may make available one or more API(s) 154 that may be used by skill computing device(s) 125 for prediction requests.

Figure 7:
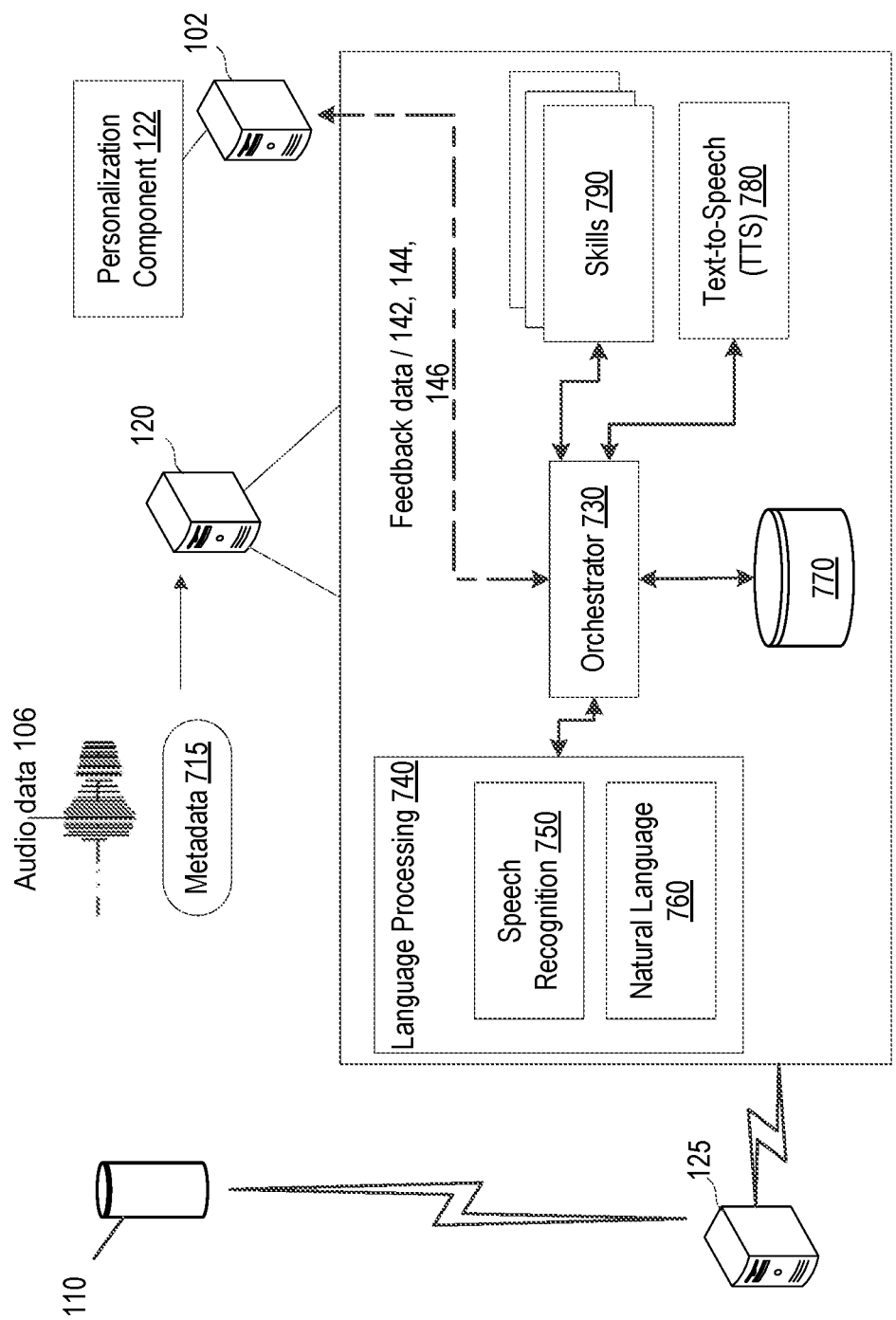
FIG. 7 is a conceptual diagram of components of a speech processing device(s) according to various embodiments of the present disclosure.

A system according to the present disclosure may operate using various components as described in FIG. 7. The various components illustrated FIG. 7 may be located on the same or different physical devices. Communication between various components illustrated in FIG. 7 may occur directly or across a network 104. The speech processing enabled device(s) 110 may capture audio using an audio capture component, such as the microphone(s) 470 (FIG. 4A). The speech processing enabled device(s) 110 may send audio data 106 (e.g., representing a spoken user request), corresponding to spoken audio, to the speech processing computing device(s) 120. The speech processing enabled device(s) 110 may include a wakeword detection component that detects when input audio includes a spoken wakeword. In some instances, the speech processing enabled device(s) 110 may be configured to send audio data 106 to the speech processing computing device(s) 120 when the speech processing enabled device(s) 110 detects a spoken wakeword. The speech processing enabled device(s) 110 may also send metadata 715 (e.g., including encoded states of speech processing enabled device(s) 110, timestamp data, etc.) to the speech processing computing device(s) 120. The metadata 715 may be created by a computing component of the speech processing enabled device(s) 110.

Upon receipt by the speech processing computing device(s) 120, the audio data 106 may be sent to an orchestrator 730. The orchestrator 730 may include memory and logic that enables the orchestrator 730 to transmit various pieces and forms of data to various components of the system. In various examples, orchestrator 730 may be configured in communication with computing device(s) 102 and personalization component 122 executing on computing device(s) 102. For example, orchestrator 730 may send speech processing data, contextual data 142, and/or user data 144 to computing device(s) 102.

The orchestrator 730 may send the audio data 106 to a language processing component 740. An ASR component 750 (e.g., a speech recognition component) of the language processing component 740 transcribes the audio data 106 into one or more hypotheses representing speech contained in the audio data 106. The ASR component 750 interprets the speech in the audio data based on a similarity between the characteristics of the audio data corresponding to the speech and pre-established language models. For example, the ASR component 750 may compare the audio data 106 with models for sounds (e.g., subword units such as phonemes) and sequences of sounds to identify words that match the sequence of sounds in the speech represented in the audio data 106. The ASR component 750 may send text data generated thereby to a Natural language component 760 of the language processing component 740. The text data output by the ASR component 750 may include a top scoring hypothesis of the speech represented in the audio data 106 or may include an N-best list including a group of hypotheses of the speech represented in the audio data 106, and potentially respective scores ASR processing confidence scores.

The natural language component 760 attempts to make a semantic interpretation of the phrases or statements represented in the text data input therein. That is, the natural language component 760 determines one or more meanings associated with the phrases or statements represented in the text data based on individual words represented in the text data. The natural language component 760 interprets a text string to derive an intent of the user (e.g., an action that the user desires be performed) as well as pertinent pieces of information in the text data that allow a device (e.g., the speech processing computing device(s) 120, the skill computing device(s) 125, etc.) to complete the intent. For example, if the text data corresponds to "Play the new album by [Musical_Artist]", the natural language component 760 may determine the user intended to invoke a music playback intent with to play the relevant album. In various examples, the metadata 715 may be an indication of data displayed and/or output by speech processing enabled device(s) 110 and/or data related to a current device state of speech processing enabled device(s) 110. Accordingly, the metadata 715 may be provided to personalization component 122 executing on computing device(s) 102 along with NLU data representing a semantic interpretation of the user speech as feedback data that may be used by personalization component 122 to store training examples and/or compute global feature data. In various examples, orchestrator 730 may send feedback data representing a semantic interpretation of user speech to personalization component 122. In various other examples, orchestrator 730 may send contextual data 142 from a contextual data service of speech processing computing device(s) 120 to personalization component 122. In at least some examples, feedback data may comprise a data representation of user sentiment (e.g., user speech representing a positive or negative reaction associated with content output by speech processing enabled device(s) 110). In some other examples, a machine learning model executed by speech processing computing device(s) 120 and/or computing device(s) 102 may score semantic interpretations of user speech in order to rank speech as indicating positive/negative user sentiment with respect to the content output by speech processing enabled device(s) 110. For example, a convolutional neural network may be trained to score spoken user feedback that selects the currently-output content or praises the currently-output content highly, while scoring user feedback that interrupts the currently-output content or disparages the currently-output content lowly. It should be appreciated that the foregoing example is merely one implementation and other models may be used to estimate user sentiment. The scores may be provided to personalization component 122 and may be used to train and select content for output by personalization model 180, as described herein. In various examples, skills 790 (e.g., executed by speech processing computing device(s) 120 and/or by skill computing device(s) 125) may send content to personalization component 122 for prediction.

The speech processing computing device(s) 120 may include a profile storage 770. The profile storage 770 may include a variety of information related to individual users, groups of users, etc. that interact with the system. For example, the profile storage 770 may store user data 144, device data 146, and/or contextual data 142. The user profile storage 770 may include one or more profiles. Each profile may be associated with a different identifier (ID), such as an identifier of speech processing enabled device(s) 110. A profile may be an umbrella profile specific to a group of users. That is, a profile encompasses two or more individual user profiles, each associated with a respective unique user ID. For example, a profile may be a household profile that encompasses user profiles associated with multiple users of a single household. Similarly, a profile may be associated with two or more users of a household and other speech processing enabled devices of those users. A profile may include preferences shared by all the user profiles encompassed thereby. Each user profile encompassed under a single profile may include preferences specific to the user associated therewith. That is, each user profile may include preferences unique from one or more other user profiles encompassed by the same profile. A user profile may be a stand-alone profile or may be encompassed under a customer profile. As illustrated, the user profile storage 770 is implemented as part of the speech processing computing device(s) 120. However, it should be appreciated that the user profile storage 770 may be located proximate to the speech processing computing device(s) 120, or may otherwise be in communication with the speech processing computing device(s) 120, for example over the network(s) 104.

The speech processing computing device(s) 120 may include one or more skills 790 configured to perform the various techniques herein disclosed, as well as other, processes. The speech processing computing device(s) 120 may also be in communication with one or more skill computing device(s) 125 that execute one or more skills configured to perform the herein disclosed, as well as other, processes. To enable a skill 790 to execute, orchestrator 730 may send output from the Natural language component 760 (e.g., text data including tags attributing meaning to the words and phrases represented in the text data), and optionally output from the profile storage 770 to the skill 790.

The speech processing computing device(s) 120 may also include a TTS component 780 that synthesizes speech (e.g., generates audio data) corresponding to text data input therein. The TTS component 780 may perform speech synthesis using one or more different methods. In one method of synthesis called unit selection, the TTS component 780 matches text data against one or more databases of recorded speech. Matching units are selected and concatenated together to form audio data. In another method of synthesis called parametric synthesis, the TTS component 780 varies parameters such as frequency, volume, and noise to create an artificial speech waveform output. Parametric synthesis uses a computerized voice generator, sometimes called a vocoder. In various examples, the TTS component 780 may output prediction results returned from personalization component 122 to skills executing by speech processing computing device(s) 120 and/or skill computing device(s) 125.

The various components (730/740/750/760/780/790) described above may exist in software, hardware, firmware, or some combination thereof.

The computing device(s) 102 and/or the speech processing computing device(s) 120 may reside on speech processing enabled device(s) 110, in a cloud computing environment, or some combination thereof. For example, the speech processing enabled device(s) 110 may include computing equipment, some portion of which is configured with all/some of the components/functionality of speech processing computing device(s) 120 and another portion of which is configured with all/some of the components/functionality of computing device(s) 102. The speech processing enabled device(s) 110 may then perform a variety of functions on its own (such as when remote communications are unavailable), and/or may communicate (when capable) with computing device(s) 102 and/or the speech processing computing device(s) 120 to perform other functions. Alternatively, all of the functionality may reside on the speech processing enabled device(s) 110 or remotely.

Figure 8:
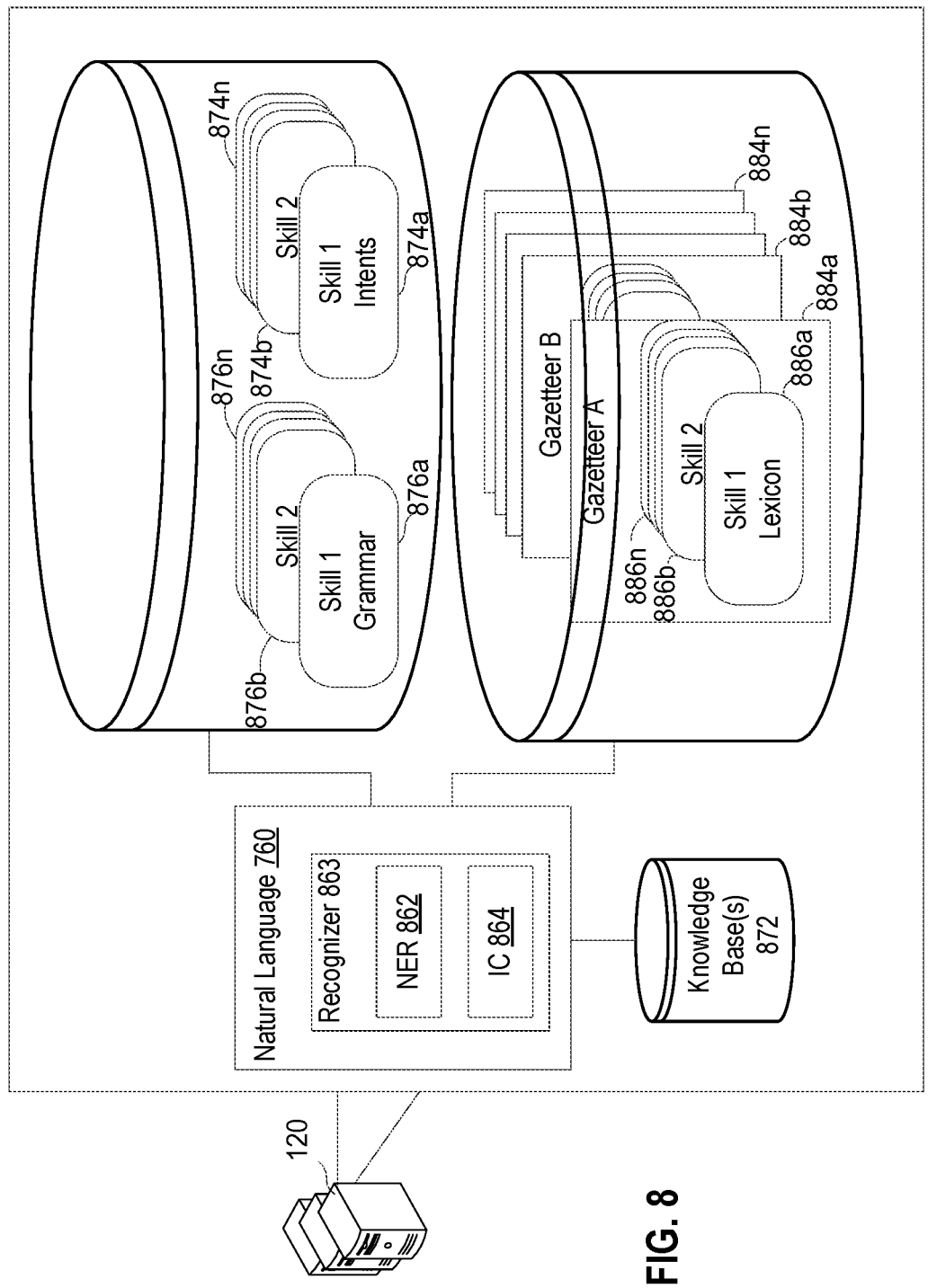
FIG. 8 is a conceptual diagram illustrating how natural language understanding processing is performed according to embodiments of the present disclosure.

FIG. 8 illustrates how NLU processing is performed on text data. Generally, the Natural language component 760 attempts to make a semantic interpretation of text data input thereto. That is, the natural language component 760 determines the meaning behind text data based on the individual words and/or phrases represented therein. The natural language component 760 interprets text data to derive an intent of the user as well as pieces of the text data that allow a device (e.g., the speech processing enabled device(s) 110, the speech processing computing device(s) 120, etc.) to complete that action.

The natural language component 760 may process text data including several ASR hypotheses. The natural language component 760 may process all (or a portion of) the ASR hypotheses input therein. Even though the ASR component 750 may output multiple ASR hypotheses, the natural language component 760 may be configured to only process with respect to the top scoring ASR hypothesis.

The natural language component 760 may include one or more recognizers 863. Each recognizer 863 may be associated with a different skill 790. Each recognizer 863 may process with respect to text data input to the natural language component 760. Each recognizer 863 may operate at least partially in parallel with other recognizers 863 of the natural language component 760.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity that may be applicable to processing performed by a skill 790. The NER component 862 (or other component of the natural language component 760) may also determine whether a word refers to an entity whose identity is not explicitly mentioned in the text data, for example "him," "her," "it" or other anaphora, exophora or the like.

Each recognizer 863, and more specifically each NER component 862, may be associated with a particular grammar model and/or database, a particular set of intents/actions (e.g., in intents database 874), and a particular personalized lexicon 886. Each gazetteer 884 may include skill-indexed lexical information associated with a particular user and/or speech processing enabled device 110. For example, a Gazetteer A (884a) includes skill-indexed lexicon 886a to 886n. A user's music skill lexical information might include album titles, artist names, and song names, for example, whereas a user's contact list skill lexical information might include the names of contacts. Since every user's music collection and contact list is presumably different, this personalized information improves entity resolution.

An NER component 862 applies grammar models 876 and lexicon 886 to determine a mention of one or more entities in text data. In this manner, the NER component 862 identifies "slots" (corresponding to one or more particular words in text data) that may be used for later processing. The NER component 862 may also label each slot with a type (e.g., noun, place, city, artist name, song name, etc.).

Each grammar model 876 includes the names of entities (i.e., nouns) commonly found in speech about the particular skill 790 to which the grammar model 876 relates, whereas the lexicon 886 is personalized to the user and/or the speech processing enabled device 110 from which the user input originated. For example, a grammar model 876 associated with a shopping skill may include a database of words commonly used when people discuss shopping.

Each recognizer 863 may also include an intent classification (IC) component 864. An IC component 864 parses text data to determine an intent(s). An intent represents an action a user desires be performed. An IC component 864 may communicate with an intents database 874 of words linked to intents. For example, a music intent database may link words and phrases such as "quiet," "volume off," and "mute" to a <Mute> intent. An IC component 864 identifies potential intents by comparing words and phrases in text data to the words and phrases in an intents database 874.

The intents identifiable by a specific IC component 864 are linked to skill-specific grammar models 876 with "slots" to be filled. Each slot of a grammar model 876 corresponds to a portion of text data that the system believes corresponds to an entity. For example, a grammar model 876 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (e.g., implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886, attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as hidden Markov models, maximum entropy models, log linear models, conditional random fields (CRF), and the like. For example, an NER component 862 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb, which an IC component 864 may determine corresponds to a <PlayMusic> intent. At this stage, no determination has been made as to the meaning of "mother's little helper" and "the rolling stones," but based on grammar rules and models, the NER component 862 has determined the text of these phrases relates to the grammatical object (i.e., entity) of the user input represented in the text data.

The models linked to the intent are then used to determine what database fields should be searched to determine the meaning of these phrases, such as searching a user's gazetteer 884 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 884 does not resolve a slot/field using gazetteer information, the NER component 862 may search a database of generic words (e.g., in the knowledge base 872). For example, if the text data includes "play songs by the rolling stones," after failing to determine an album name or song name called "songs" by "the rolling stones," the NER component 862 may search the database for the word "songs." In the alternative, generic words may be checked before the gazetteer information, or both may be tried, potentially producing two different results.

An NER component 862 may tag text data to attribute meaning thereto. For example, an NER component 862 may tag "play mother's little helper by the rolling stones" as: {skill} Music, {intent}<PlayMusic>, {artist name} rolling stones, {media type} SONG, and {song title} mother's little helper. For further example, the NER component 862 may tag "play songs by the rolling stones" as: {skill} Music, {intent}<PlayMusic>, {artist name} rolling stones, and {media type} SONG.

Figure 9:
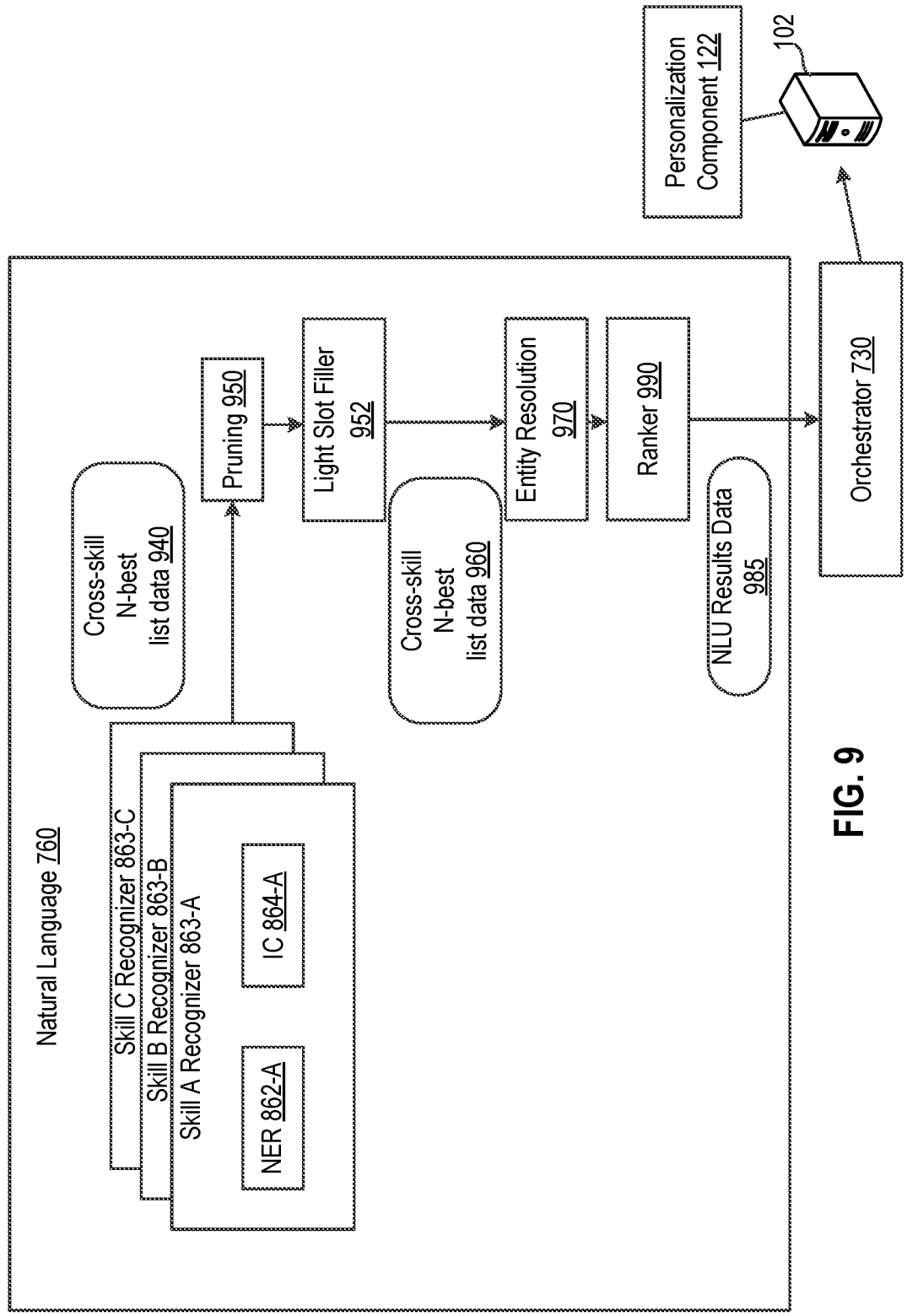
FIG. 9 is a conceptual diagram illustrating how natural language understanding processing is performed according to embodiments of the present disclosure.

The natural language component 760 may generate cross-skill N-best list data 940, which may include a list of NLU hypotheses output by each recognizer 863 (as illustrated in FIG. 9). A recognizer 863 may output tagged text data generated by an NER component 862 and an IC component 864 operated by the recognizer 863, as described above. Each NLU hypothesis including an intent indicator and text/slots may be grouped as an NLU hypothesis represented in the cross-skill N-best list data 940. Each NLU hypothesis may also be associated with one or more respective score(s) for the NLU hypothesis. For example, the cross-skill N-best list data 940 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

In at least some examples, speech processing data may comprise NLU data generated by natural language component 760. For example, NLU data may indicate that a user interrupted an action related to content displayed on speech processing enabled device 110 while in an ambient state. In another example, NLU data may indicate that a user invoked a skill related to content output by a speech processing enabled device 110. Feature data representative of the speech processing data and/or contextual data 142, user data 144, and/or device data 146 may be used to compute features and may be provided as an input to personalization model 180 and/or stored in memory for use as training data.

In various examples, the cross-skill N-best list data 940 and/or 960 may comprise the N-best Intents data—e.g., a list of N intents with the highest confidence scores among intents scored for a particular utterance). The natural language component 760 may send the cross-skill N-best list data 940 to a pruning component 950. The pruning component 950 may sort the NLU hypotheses represented in the cross-skill N-best list data 940 according to their respective scores. The pruning component 950 may then perform score thresholding with respect to the cross-skill N-best list data 940. For example, the pruning component 950 may select NLU hypotheses represented in the cross-skill N-best list data 940 associated with confidence scores satisfying (e.g., meeting and/or exceeding) a threshold confidence score. The pruning component 950 may also or alternatively perform number of NLU hypothesis thresholding. For example, the pruning component 950 may select a maximum threshold number of top scoring NLU hypotheses. The pruning component 950 may generate cross-skill N-best list data 960 including the selected NLU hypotheses. The purpose of the pruning component 950 is to create a reduced list of NLU hypotheses so that downstream, more resource intensive, processes may only operate on the NLU hypotheses that most likely represent the user's intent. In various examples, orchestrator 730 and/or another component of speech processing computing device(s) 120 may send speech processing data 140 (e.g., NLU hypotheses, user intents, user satisfaction scores, etc.) to personalization component 122 of computing device(s) 102. Personalization component 122 may extract feature data from the speech processing data 140 that may be used to predict content (and/or other parameters related to the content, such as duration, frequency, timing-of-output, etc.). Additionally, speech processing data may be used to generate feedback data, that may in turn, be used to train and/or retrain personalization model 180 of personalization component 122.

The natural language component 760 may also include a light slot filler component 952. The light slot filler component 952 can take text data from slots represented in the NLU hypotheses output by the pruning component 950 and alter it to make the text data more easily processed by downstream components. The light slot filler component 952 may perform low latency operations that do not involve heavy operations, such as those requiring reference to a knowledge base. The purpose of the light slot filler component 952 is to replace words with other words or values that may be more easily understood by downstream system components. For example, if an NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-skill N-best list data 960.

The natural language component 760 sends the cross-skill N-best list data 960 to an entity resolution component 970. The entity resolution component 970 can apply rules or other instructions to standardize labels or tokens from previous stages into an intent/slot representation. The precise transformation may depend on the skill 790. For example, for a travel skill, the entity resolution component 970 may transform text data corresponding to "Seattle airport" to the standard SEA three-letter code referring to the airport. The entity resolution component 970 can refer to a knowledge base that is used to specifically identify the precise entity referred to in each slot of each NLU hypothesis represented in the cross-skill N-best list data 960. Specific intent/slot combinations may also be tied to a particular source, which may then be used to resolve the text data. In the example "play songs by the stones," the entity resolution component 970 may reference a personal music catalog, Amazon Music account, user profile data, or the like. The entity resolution component 970 may output text data including an altered N-best list that is based on the cross-skill N-best list data 960, and that includes more detailed information (e.g., entity IDs) about the specific entities mentioned in the slots and/or more detailed slot data that can eventually be used by downstream components to perform an action responsive to the user input. The natural language component 760 may include multiple entity resolution components 970 and each entity resolution component 970 may be specific to one or more skills 790.

The entity resolution component 970 may not be successful in resolving every entity and filling every slot represented in the cross-skill N-best list data 960. This may result in the entity resolution component 970 outputting incomplete results.

The natural language component 760 may include a ranker component 990. The ranker component 990 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the entity resolution component 970.

The ranker component 990 may apply re-scoring, biasing, and/or other techniques to determine the top scoring NLU hypotheses. To do so, the ranker component 990 may consider not only the data output by the entity resolution component 970, but may also consider other data such as skill 790 rating or popularity data. For example, if one skill 790 has a particularly high rating, the ranker component 990 may increase the score of an NLU hypothesis associated with that skill 790, and vice versa. The other data may include information about skills 790 that have been enabled for the user identifier and/or device identifier associated with the current user input. For example, the ranker component 990 may assign higher scores to NLU hypotheses associated with enabled skills 790 than NLU hypotheses associated with non-enabled skills 790. The other data may include data indicating user usage history, such as if the user identifier associated with the current user input is regularly associated with user inputs that invoke a particular skill 790 or does so at particular times of day. The other data may include data indicating date, time, location, weather, type of speech processing enabled device 110, user identifier, device identifier, context, as well as other information. For example, the ranker component 990 may consider when any particular skill 790 is currently active (e.g., music being played, a game being played, etc.) with respect to the user or speech processing enabled device 110 associated with the current user input. The other data may include device type information. For example, if the speech processing enabled device 110 does not include a display, the ranker component 990 may decrease the score associated with an NLU hypothesis that would result in displayable content being presented to a user, and vice versa.

Following ranking by the ranker component 990, the natural language component 760 may output NLU results data 985 to the orchestrator 730. The NLU results data 985 may include a ranked list of the top scoring NLU hypotheses as determined by the ranker component 990. Alternatively, the NLU results data 985 may include the top scoring NLU hypothesis as determined by the ranker component 990.

The orchestrator 730 may select a skill 790, based on the NLU results data 885, for performing an action responsive to the user input. In an example, the orchestrator 730 may send all (or a portion of) the NLU results data 985 to a skill 790 that is represented in the NLU results data 985 and to be invoked to perform an action responsive to the user input.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of ranking content, the method comprising:
   receiving, by a personalization component from a first speech processing skill, prediction type data, wherein the prediction type data instructs the personalization component to rank content received from the first speech processing skill;
   receiving, by the personalization component from the first speech processing skill, first skill data describing first content for ranking by the personalization component;
   determining, by the personalization component, a first machine learning model for ranking the first content according to the prediction type data;
   generating, by the personalization component, a first feature definition describing an aspect of the first skill data;
   generating, by the personalization component, a second feature definition describing user profile data generated by a speech processing system associated with user interaction with the first speech processing skill;
   receiving, by the personalization component from the first speech processing skill, second skill data comprising an unranked list of second content;
   receiving, by the personalization component from the first speech processing skill, a request to rank the second content of the second skill data;
   generating, by the personalization component according to the first feature definition, first feature data for the second skill data, wherein the first feature data comprises a first vector representation of the unranked list of the second content;
   generating, by the personalization component according to the second feature definition, second feature data for the second skill data, wherein the second feature data comprises a second vector representation of the user profile data;
   generating, by the first machine learning model, a ranked list of the second content in response to an input to the first machine learning model comprising the first feature data and the second feature data; and
   sending the ranked list of the second content to the first speech processing skill.

2. The method of claim 1, further comprising:
   receiving, by the personalization component from the speech processing system, feedback data comprising an indication of user interaction with at least a portion of the second content as output by the speech processing enabled device;
   storing the feedback data in a non-transitory computer-readable memory as a label in association with the first feature data and the second feature data; and
   retraining the first machine learning model using the feedback data and the label to update a parameter of the first machine learning model.

3. The method of claim 1, further comprising:
   receiving, by the personalization component from a second speech processing skill, second prediction type data, wherein the second prediction type data instructs the personalization component to classify content provided by the second speech processing skill;
   receiving, by the personalization component from the second speech processing skill, third skill data describing third content for classification;
   determining, by the personalization component, a second machine learning model for classifying the second content according to the second prediction type data;
   generating, by the personalization component computing device, a third feature definition describing an aspect of the third skill data;
   receiving, by the personalization component from the second speech processing skill, fourth skill data;
   receiving, by the personalization component from the second speech processing skill, a request to classify fourth content of the fourth skill data;
   generating, by the personalization component according to the third feature definition, third feature data for the fourth skill data, wherein the third feature data comprises a third vector representation of unclassified content described by the fourth skill data;
   generating, by the personalization component according to the second feature definition, fourth feature data for the fourth content, wherein the fourth feature data comprises a fourth vector representation of the user profile data;
   generating, by the second machine learning model, a classification of the fourth content in response to an input to the second machine learning model comprising the third feature data and the fourth feature data; and
   sending the classification of the fourth content to the second speech processing skill.

4. The method of claim 1, further comprising:
determining, by the personalization component, a second machine learning model for ranking the content according to the prediction type data;
generating, by the personalization component, a third feature definition for the second machine learning model, the third feature definition describing a second aspect of the first skill data;
determining, by the personalization component, first performance evaluation data for the first machine learning model according to an optimization metric;
determining, by the personalization component, second performance evaluation data for the second machine learning model according to the optimization metric;
determining, by the personalization component, that the first performance evaluation data indicates enhanced performance of the first machine learning model relative to the second machine learning model; and
deploying the first machine learning model for prediction in response to the first performance evaluation data indicating enhanced performance of the first machine learning model relative to the second machine learning model.

5. A method, comprising:
receiving, from a first skill, a first request to rank content, wherein the first request comprises a list of unranked content and device data identifying a device;
determining a first machine learning model associated with the first skill;
determining a first feature definition describing a first aspect of the content;
generating first feature data according to the first feature definition;
determining a second feature definition describing interaction with the first skill;
determining first user profile data associated with the device;
generating second feature data according to the second feature definition based on the first user profile data;
generating, by the first machine learning model, a ranked list of the content based at least in part on the first feature data and the second feature data; and
sending the ranked list to the first skill.

6. The method of claim 5, further comprising:
determining a third feature definition describing contextual data of a speech processing system;
determining the contextual data from the speech processing system in response to the first request;
generating third feature data from the contextual data according to the third feature definition; and
sending the third feature data to the first machine learning model, wherein the generating the ranked list is further based at least in part on the third feature data.

7. The method of claim 5, further comprising:
receiving, from a speech processing system, feedback data comprising an indication of interaction with a first content item of the ranked list of the content;
storing, in a non-transitory computer-readable memory, the feedback data as a label in association with the first feature data; and
training the first machine learning model using the label in association with the first feature data.

8. The method of claim 5, further comprising:
receiving a prediction type for the first skill; and
determining the first machine learning model based at least in part on the prediction type corresponding to a capability of the first machine learning model.

9. The method of claim 5, further comprising:
storing first data representing a source of metadata describing the content, in a non-transitory computer-readable memory;
storing second data in the non-transitory computer-readable memory in association with the first data, wherein the second data represents an attribute of the metadata used to compute the first feature data; and
storing function data in the non-transitory computer-readable memory in association with the first data and the second data, wherein the function data specifies a function operable to determine the attribute from the source and generate the first feature data.

10. The method of claim 5, further comprising:
determining a second machine learning model for the first skill;
determining first performance evaluation data for the first machine learning model according to an optimization metric;
determining second performance evaluation data for the second machine learning model according to the optimization metric;
determining that the first performance evaluation data indicates enhanced performance of the first machine learning model relative to the second machine learning model; and
selecting the first machine learning model for prediction based at least in part on the first performance evaluation data indicating enhanced performance of the first machine learning model relative to the second machine learning model.

11. The method of claim 5, further comprising:
receiving, from the first skill, a registration request for machine learning prediction, wherein the registration request comprises a prediction type;
receiving, from the first skill, skill data schema comprising metadata describing candidate actions associated with the first skill;
determining the first machine learning model based on the prediction type; and
determining the first feature definition based at least in part on the skill data schema.

12. The method of claim 5, further comprising:
receiving, from the first skill, optimization metric data;
receiving, from the first skill, a request to retrain the first machine learning model according to the optimization metric data; and
updating weights of the first machine learning model based at least in part on the request to retrain the first machine learning model and the optimization metric data.

13. A system, comprising:
at least one processor; and
at least one non-transitory computer-readable memory storing instructions that, when executed by the at least one processor, program the at least one processor to perform a method comprising:
receiving, from a first skill, a first request to rank content, wherein the first request comprises a list of unranked content and device data identifying a device;
determining a first machine learning model associated with the first skill;
determining a first feature definition describing a first aspect of the content;
generating first feature data according to the first feature definition;

determining a second feature definition describing interaction with the first skill;
determining first user profile data associated with the device;
generating second feature data according to the second feature definition based on the first user profile data;
generating, by the first machine learning model, a ranked list of the content based at least in part on the first feature data and the second feature data; and
sending the ranked list to the first skill.

14. The system of claim 13, wherein the instructions, when executed by the at least one processor, program the at least one processor to perform the method further comprising:
determining a third feature definition describing contextual data of a speech processing system;
determining the contextual data from the speech processing system in response to the first request;
generating third feature data from the contextual data according to the third feature definition; and
sending the third feature data to the first machine learning model, wherein the generating the ranked list is further based at least in part on the third feature data.

15. The system of claim 13, wherein the instructions, when executed by the at least one processor, program the at least one processor to perform the method further comprising:
receiving, from a speech processing system, feedback data comprising an indication of interaction with a first content item of the ranked list of the content;
storing, in a non-transitory computer-readable memory, the feedback data as a label in association with the first feature data; and
training the first machine learning model using the label in association with the first feature data.

16. The system of claim 13, wherein the instructions, when executed by the at least one processor, program the at least one processor to perform the method further comprising:
receiving a prediction type for the first skill; and
determining the first machine learning model based at least in part on the prediction type corresponding to a capability of the first machine learning model.

17. The system of claim 13, wherein the instructions, when executed by the at least one processor, program the at least one processor to perform the method further comprising:
storing first data representing a source of metadata describing the content, in a non-transitory computer-readable memory;
storing second data in the non-transitory computer-readable memory in association with the first data, wherein the second data represents an attribute of the metadata used to compute the first feature data; and
storing function data in the non-transitory computer-readable memory in association with the first data and the second data, wherein the function data specifies a function operable to determine the attribute from the source and generate the first feature data.

18. The system of claim 13, wherein the instructions, when executed by the at least one processor, program the at least one processor to perform the method further comprising:
determining a second machine learning model for the first skill;
determining first performance evaluation data for the first machine learning model according to an optimization metric;
determining second performance evaluation data for the second machine learning model according to the optimization metric;
determining that the first performance evaluation data indicates enhanced performance of the first machine learning model relative to the second machine learning model; and
selecting the first machine learning model for prediction based at least in part on the first performance evaluation data indicating enhanced performance of the first machine learning model relative to the second machine learning model.

19. The system of claim 13, wherein the instructions, when executed by the at least one processor, program the at least one processor to perform the method further comprising:
receiving, from the first skill, a registration request for machine learning prediction, wherein the registration request comprises a prediction type;
receiving, from the first skill, skill data schema comprising metadata describing candidate actions associated with the first skill;
determining the first machine learning model based on the prediction type; and
determining the first feature definition based at least in part on the skill data schema.

20. The system of claim 13, wherein the instructions, when executed by the at least one processor, program the at least one processor to perform the method further comprising:
receiving, from the first skill, optimization metric data;
receiving, from the first skill, a request to retrain the first machine learning model according to the optimization metric data; and
updating weights of the first machine learning model based at least in part on the request to retrain the first machine learning model and the optimization metric data.

* * * * *